(12) United States Patent
Harada et al.

(10) Patent No.: US 7,613,412 B2
(45) Date of Patent: Nov. 3, 2009

(54) DEVICE AND JOB HISTORY DISPLAY CONTROL METHOD

(75) Inventors: Fumio Harada, Saitama (JP); Yuriko Inakawa, Saitama (JP); Atsuhiro Itoh, Saitama (JP); Jun Wakamatsu, Saitama (JP); Noriyuki Tatsuma, Saitama (JP); Eiji Nishi, Saitama (JP); Akira Okamoto, Saitama (JP); Masaki Kurokawa, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 477 days.

(21) Appl. No.: 11/392,585

(22) Filed: Mar. 30, 2006

(65) Prior Publication Data

US 2007/0067680 A1 Mar. 22, 2007

(30) Foreign Application Priority Data

Sep. 21, 2005 (JP) ............................. 2005-273868

(51) Int. Cl.
*G03G 15/00* (2006.01)
(52) U.S. Cl. .................. 399/81; 715/741; 715/750; 399/80
(58) Field of Classification Search .................. 399/80, 399/81, 82; 715/741, 743, 744, 745, 750; 358/1.15, 1.16, 1.18
See application file for complete search history.

(56) References Cited

U.S. PATENT DOCUMENTS

| 6,151,464 | A | * | 11/2000 | Nakamura et al. | ............. 399/79 |
| 6,507,716 | B2 | * | 1/2003 | Nomura et al. | ................ 399/80 |
| 7,221,885 | B2 | * | 5/2007 | Sato | .............................. 399/81 |
| 2006/0023247 | A1 | * | 2/2006 | Yamakawa | .................. 358/1.14 |
| 2006/0050291 | A1 | * | 3/2006 | Morikawa et al. | ........... 358/1.13 |
| 2006/0245006 | A1 | * | 11/2006 | Nakata et al. | ................ 358/448 |
| 2007/0061374 | A1 | * | 3/2007 | Inakawa et al. | .............. 707/200 |

FOREIGN PATENT DOCUMENTS

| JP | 7-319773 | A | | 12/1995 |
| JP | 08-185349 | A | | 7/1996 |
| JP | 2003208291 | A | * | 7/2003 |
| JP | 2003-280867 | A | | 10/2003 |

\* cited by examiner

*Primary Examiner*—Robert Beatty
(74) *Attorney, Agent, or Firm*—Sughrue Mion, PLLC

(57) ABSTRACT

A device for performing a processing in response to a request received from a requester, comprises a receiving unit that receives the request or authentication information from the requestor; a processing unit that performs processing according to the request received by the receiving unit; a job history memory that stores a history of job performed by the processing unit; and a job history display controller that controls a display of a job history list in response to the request from the requestor, wherein the job history display controller restricts a display of a history of job which has been performed in response to a request from other requestor than the first-mentioned requestor and belongs to the other requester.

16 Claims, 25 Drawing Sheets

| NO. | JOB NAME | USER NAME | PRINT-OUT RESULT | NO. OF PAGES | OTHER INFORMATION | | |
|---|---|---|---|---|---|---|---|
| 1 | AA extension-number list.xls | YAMADA Hajime | Normally Completed | 1 | Information ia | ..... | Information ij |
| 2 | BB business diary.doc | SASAKI Daijiro | Normally Completed | 2 | ..... | ..... | ..... |
| 3 | classified document-CC.txt | YAMADA Hajime | Normally Completed | 5 | ..... | ..... | ..... |
| 4 | FF cotract.txt | FUJI Taro | Normally Completed | 2 | Information ga | ..... | Information gj |
| 5 | - | - | Normally Completed | 2 | ..... | ..... | ..... |
| 6 | confidential data:DD book.xls | SASAKI Daijiro | Normally Completed | 10 | ..... | ..... | ..... |
| 7 | - | - | Normally Completed | 1 | ..... | ..... | ..... |
| 8 | document 2000.xls | ODA Hanako | Normally Completed | 35 | Information ca | ..... | Information cj |
| 9 | mail 300.doc | FUJI Taro | Normally Completed | 3 | Information ba | ..... | Information bj |
| 10 | document 10.doc | FUJI Taro | Normally Completed | 20 | Information aa | ..... | Information aj |

FIG.2

| SECURITY LEVEL | DISPLAY METHOD OF JOB NAME | DISPLAY METHOD OF USER NAME | DISPLAY METHOD OF OTHER USER'S JOB NAME | DISPLAY METHOD OF OTHER USER NAME | DISPLAY METHOD OF JOB NAME AND USER NAME INDICATED BY ":" | DISPLAY METHOD OF OTHER INFORMATION |
|---|---|---|---|---|---|---|
| 7 (High) | Not display | Not display | Not display | Not display | Not display | Not display |
| 6 | Display directly | Display directly | Not display | Not display | Not display | Not display |
| 5 | Display directly | Display directly | Not display | Not display | Display directly | Display directly |
| 4 | Display directly | Display directly | Mask-display with "@" (including spaces) | Mask-display with "@" (including spaces) | Display directly | Display directly |
| 3 | Display directly | Display directly | Mask-display with "@" (including spaces) | Display by replacing user names with "a", "b", "c" and so on, respectively | Display directly | Display directly |
| 2 | Display directly | Display directly | Mask-display by replacing characters with "@" | Mask-display by replacing with "@" (including spaces) | Display directly | Display directly |
| 1 (Low) | Display directly | Display directly | Display directly | Display directly | Display directly | Display directly |

FIG.3

| JOB LIST | | | | | |
|---|---|---|---|---|---|
| JOB NAME | USER NAME | PRINT-OUT RESULT | NO. OF PAGES | INFORMATION A | INFORMATION J |
| document 10. doc | FUJI Taro | Normally Completed | 20 | Information aa | Information aj |
| mail 300. doc | FUJI Taro | Normally Completed | 3 | Information ba | Information bj |
| @@@@@@@@@@ | user-c | Normally Completed | 35 | Information ca | Information cj |
| - | - | Normally Completed | 1 | ..... | ..... |
| @@@@@@@@@@@@@@@@@@ | user-b | Normally Completed | 10 | ..... | ..... |
| - | - | Normally Completed | 2 | ..... | ..... |
| FF contract. txt | FUJI Taro | Normally Completed | 2 | Information ga | Information gj |
| @@@@@@@@@@@@@ | user-a | Normally Completed | 5 | ..... | ..... |
| @@@@@@@@@@@@ | user-b | Normally Completed | 2 | ..... | ..... |
| @@@@@@@@@@@@ | user-a | Normally Completed | 1 | Information ia | Information ij |

FIG.4

SECURITY LEVEL SETTING FOR JOB LIST

CURRENT SECURITY LEVEL : 2

SECURITY LEVEL SETTING: 6 ▼

2
3
4
5
6
7

OK   CANCEL

FIG.5

| JOB LIST | | | | | |
|---|---|---|---|---|---|
| JOB NAME | USER NAME | PRINT-OUT RESULT | NO. OF PAGES | INFORMATION A | INFORMATION J |
| document 10. doc | FUJI Taro | Normally Completed | 20 | Information aa | Information aj |
| mail 300. doc | FUJI Taro | Normally Completed | 3 | Information ba | Information bj |
| FF contract. txt | FUJI Taro | Normally Completed | 2 | Information ga | Information gj |

FIG.6

| SECURITY LEVEL | DISPLAY METHOD OF JOB NAME |
|---|---|
| 8 (High) | • Not display at all (not display the item "Job Name" itself) |
| 7 | • Display only job names of the user's own jobs |
| 6 | • Display job names of the user's own jobs<br>• Not display job names indicated by "-"<br>• Not display job names of other users' jobs |
| 5 | • Display job names of the user's own jobs<br>• Display job names indicated by "-"<br>• Mask-display job names of other users' jobs by masking them (including spaces) with "@" |
| 4 | • Display job names of the user's own jobs<br>• Not display job names indicated by "-"<br>• Mask-display job names of other users' jobs by replacing characters with "@" |
| 3 | • Display directly job names of the user's own jobs and jobs indicated by "-"<br>• Mask-display job names of other users' jobs by masking them (including spaces) with "@" |
| 2 | • Display directly job names of the user's own jobs and jobs indicated by "-"<br>• Display job names of other users' jobs by replacing characters with "@" |
| 1 (Low) | • Display directly all the job names |

FIG.7

| SECURITY LEVEL | DISPLAY METHOD OF USER NAME |
|---|---|
| 8 (High) | ○ Not display at all (not display the item "User Name" itself) |
| 7 | ○ Display only user name of the user himself/herself |
| 6 | ○ Display user name of the user himself/herself.<br>○ Display user names indicated by "-"<br>○ Not display user names of other users |
| 5 | ○ Display user name of the user himself/herself.<br>○ Not display user names indicated by "-"<br>○ Mask-display user names of other users by masking them (including spaces) with "@" |
| 4 | ○ Display user name of the user himself/herself.<br>○ Not display users names indicated by "-"<br>○ Mask-display user names of other users by replacing them with "a", "b", "c" and so on, respectively |
| 3 | ○ Display directly user name of the user himself and those indicated by "-".<br>○ Mask-display user names of other users by masking them (including spaces) with "@" |
| 2 | ○ Display directly user names of the user himself and those indicated by "-".<br>○ Mask-display user names of other users by replacing them with "a", "b", "c" and so on, respectively |
| 1 (Low) | ○ Display directly all the user names |

FIG.8

| SECURITY LEVEL | DISPLAY METHOD OF PRINT-OUT RESULT, NUMBER OF PAGES, AND OTHER INFORMATION |
|---|---|
| 8 (High) | • Not display at all (not display these items) |
| 7 | • Display information of the items corresponding to the user himself/herself only |
| 6 | • Display information of the items corresponding to the user himself/herself<br>• Display information of the items corresponding to the user names that are indicated by "-"<br>• Not display information of the items corresponding to other users' names. |
| 5 | • Display information of the items corresponding to the user himself/herself.<br>• Not display information of the items corresponding to the user names that are indicated by "-"<br>• Mask-display information of the items corresponding to other users by masking the information (including spaces) with "@" |
| 4 | • Display information of the items corresponding to the user himself/herself<br>• Not display information of the items corresponding to the user names indicated by "-"<br>• Mask-display information corresponding to other users by replacing the information with "a", "b", "c" and so on assigned to the respective other users |
| 3 | • Display directly information of the items corresponding to the user himself and the user names indicated by "-"<br>• Mask-display information of the items corresponding to other users by masking the information (including spaces) with "@" |
| 2 | • Display directly information of he items corresponding to the user himself and the user names indicated by "-"<br>• Mask-display information of the items corresponding to other users by replacing the information with "a", "b", "c" and so on assigned to the respective other users. |
| 1 (Low) | • Display directly all information. |

FIG.9

SECURITY LEVEL SETTING FOR JOB LIST

| | |
|---|---|
| SECURITY LEVEL SETTING FOR JOB NAME | 2 ▼ |
| SECURITY LEVEL SETTING FOR USER NAME | 1 ▼ |
| SECURITY LEVEL SETTING FOR PRINT-OUT RESULT | 1 ▼ |
| SECURITY LEVEL SETTING FOR NUMBER OF PAGES | 1 ▼ |
| SECURITY LEVEL SETTING FOR INFORMATION A | 1 ▼ |
| . . . . . | . . . . . |
| SECURITY LEVEL SETTING FOR INFORMATION J | 8 ▼ |

[ OK ]   [ CANCEL ]

FIG.10

| JOB LIST | | | | | |
|---|---|---|---|---|---|
| JOB NAME | USER NAME | PRINT-OUT RESULT | NO. OF PAGES | INFORMATION A | ..... |
| document 10. doc | FUJI Taro | Normally Completed | 20 | Information aa | ..... |
| mail 300. doc | FUJI Taro | Normally Completed | 3 | Information ba | ..... |
| @@@@@@@@@@ | ODA Hanako | Normally Completed | 35 | Information ca | ..... |
| - | - | Normally Completed | 1 | ..... | ..... |
| @@@@@@@@@@@@@@@@@@ | SASAKI Daijiro | Normally Completed | 10 | ..... | ..... |
| - | - | Normally Completed | 2 | ..... | ..... |
| FF contract. txt | FUJI Taro | Normally Completed | 2 | Information ga | ..... |
| @@@@@@@@@@@@@@ | YAMADA Hajime | Normally Completed | 5 | ..... | ..... |
| @@@@@@@@@@@@@ | SASAKI Daijiro | Normally Completed | 2 | ..... | ..... |
| @@@@@@@@@@@@@ | YAMADA Hajime | Normally Completed | 1 | Information ia | ..... |

FIG.11

SECURITY LEVEL SETTING FOR JOB LIST

| | |
|---|---|
| SECURITY LEVEL SETTING FOR JOB NAME | 2 ▼ |
| SECURITY LEVEL SETTING FOR USER NAME | 4 ▼ |
| SECURITY LEVEL SETTING FOR PRINT-OUT RESULT | 4 ▼ |
| SECURITY LEVEL SETTING FOR NUMBER OF PAGES | 3 ▼ |
| SECURITY LEVEL SETTING FOR INFORMATION A | 8 ▼ |
| ..... | ..... |
| SECURITY LEVEL SETTING FOR INFORMATION J | 8 ▼ |

[ OK ]  [ CANCEL ]

FIG.12

JOB LIST

| JOB NAME | USER NAME | PRINT-OUT RESULT | NO. OF PAGES |
|---|---|---|---|
| document 10. doc | FUJI Taro | Normally Completed | 20 |
| mail 300. doc | FUJI Taro | Normally Completed | 3 |
| @@@@@@@@@@@ | user-c | c | @@@ |
| @@@@@@@@@@@@@@@@@@ | user-b | b | @@@ |
| FF contract. txt | FUJI Taro | Normally Completed | 2 |
| @@@@@@@@@@@@@ | user-a | a | @@@ |
| @@@@@@@@@@@@ | user-b | b | @@@ |
| @@@@@@@@@@@@ | user-a | a | @@@ |

FIG.13

DEVICE AND JOB HISTORY DISPLAY CONTROL METHOD

BACKGROUND OF THE INVENTION

1. Field of the Invention

The present invention relates to a device and a job history display control method, and particularly relates to a device that is designed to display a list of history of processing of jobs performed by the device for each of users, and a method of controlling the display of such job history.

2. Description of the Related Art

Conventionally, a device such as a printer has a function to display the history of jobs processed by the device (hereafter, to be referred to as "job history"). This function allows users to satisfy their desire to know their own job history, and allows an administrator to satisfy his/her desire to check the job history of all the users to find if there are any operational problems.

For example, there have been proposed techniques relating to a print system, a printer, and a program having such function. According to one such conventional technique, a printer is provided with a web server so that the web server allows to easily and promptly recognize the progress of print processing in the printer, in terms of not only the number of pages having been printed but also in terms of the contents thereof (see Japanese Patent Application Publication No. 2003-280867, for example).

Further, there have been proposed an image processor and an image processing method that are designed to preserve confidentiality of data in the image processor by placing restrictions on access to the data in the image processor from external equipment, the restrictions depending on the type and attributes of operators (see Japanese Patent Application Publication No. 07-319773, for example).

Further, there has been proposed a data security device. According to this data security device, security information is provided to specify users having authority to access a recorded data file for each item of data file, and the security information is checked for the items which the users having authority to access have accessed. For users having no authority to access to read data of an item, the data of such an item is not informed. In this data security device, the security level can be changed easily and rapidly without modifying the application to access the data file (see H8-185349, for example).

However, the conventional techniques described in Japanese Patent Application Publication Nos. 2003-280867 and 07-319773 pose a security problem because users are allowed to know job names and other information relating to other users even though the users have no intention to do so.

Also, according to the technique described in Japanese Patent Application Publication No. 08-185349, the security information needs to be set for each data file. Therefore, it is impossible to set the security information for each item of job history in a device like a printer which processes a great number of jobs.

SUMMARY OF THE INVENTION

The present invention has been made in view of the above circumstances and to provide a device and a job history display control method that enhance the security by taking measures to prevent a job history from being accessed by any other users than the user involved in the job history, and by taking measures to prevent information relating to the privacy of all the users from being acquired by any other party.

According to an aspect of the invention, a device for performing a processing in response to a request received from a requester, comprises a receiving unit that receives the request or authentication information from the requester; a processing unit that performs processing according to the request received by the receiving unit; a job history memory that stores a history of job performed by the processing unit; and a job history display controller that controls a display of a job history list in response to the request from the requester, wherein the job history display controller restricts a display of a history of job which has been performed in response to a request from other requester than the first-mentioned requestor and belongs to the other requester.

With the above configuration of the present invention, the user is allowed to access a job history that is generated by the device processing done by the user himself/herself, but not allowed to obtain information relating to other users' privacy from the job history. Thus, the security is enhanced. Moreover, the user is still allowed to know, from other users' job history, when and how much device processing has been done, and thus allowed to check the operation history of the device without impairing the security.

BRIEF DESCRIPTION OF THE DRAWINGS

Embodiment of the present invention will be described in detail based on the following figures, wherein:

FIG. 2 is a diagram illustrating an example of job histories stored in a job history memory of a printer;

FIG. 3 is a diagram illustrating an example of a table associating security levels for the display of a job history list of the entire printer with methods of displaying the items of the job history;

FIG. 4 is a diagram illustrating an example of the job history list;

FIG. 5 is a diagram illustrating an example of setting of a security level with the use of a remote control unit;

FIG. 6 is a diagram illustrating an example of a job history list;

FIG. 7 is a diagram illustrating an example of a table associating security levels for the item of "job name" with display methods;

FIG. 8 is a diagram illustrating an example of a table associating security levels for the item of "job name" with display methods;

FIG. 9 is a diagram illustrating an example of a table associating security levels for other items (e.g., "print-out result", "number of pages", and "other information") with display methods;

FIG. 10 is a diagram illustrating an example of setting of security levels for the respective items with the use of a remote control unit;

FIG. 11 is a diagram illustrating an example of a job history list;

FIG. 12 is a diagram illustrating an example of setting of security levels with the use of a remote control unit;

FIG. 13 is a diagram illustrating an example of a job history list;

DETAILED DESCRIPTION OF THE INVENTION

A device and a job history display control method according to embodiment of the present invention will now be described in detail with reference to the accompanying drawings. The device in the present invention includes a printer, a scanner, or a router or the like, having a function to store and manage a job history performed therein. The following description will be made taking a printer by way of an example.

Figure 1:
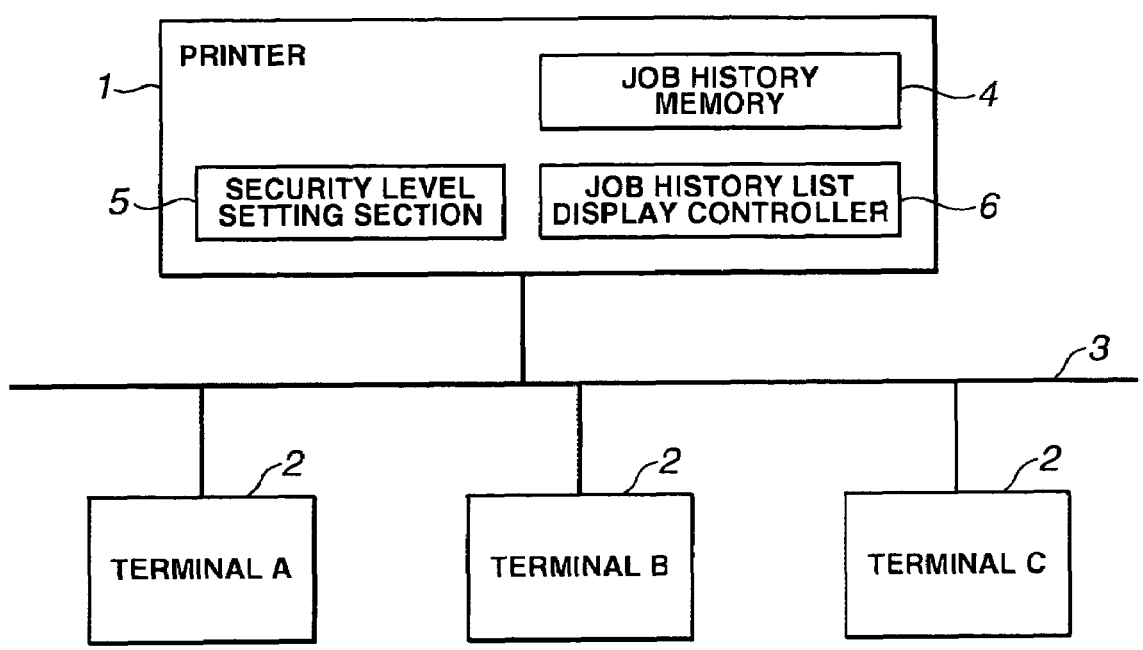
FIG. 1 is a system configuration diagram illustrating an example of a print processing system to which a device of the present invention is applied.

FIG. 1 is a system configuration diagram illustrating an example of a print processing system to which the device according to the present invention is applied.

As shown in FIG. 1, a printer 1 as the device according to the present invention is connected to terminals 2 (terminals A, B, and C) such as desktop personal computers (PCs), and notebook PCs through a network 3.

Each terminal 2 is provided with a printer driver which performs processing to generate printing data based on a file produced by an application of the terminal 2 and to request printing to the printer 1 for causing the printer to print out the file, and a remote control unit (e.g., an application) which acquires a job history list stored by the printer 1 from the printer 1 to display the job history list thus acquired, and to set security levels for controlling the display of the job history list. The remote control unit is not limited to a special application. For example, the printer 1 may instead be provided with a web server such as an EWS (Embedded Web Server), so that when the web server transmits a web screen displaying a job history list to the terminal 2, the terminal 2 may acquire and display the job history list by using a web browser. The web server may transmit to the terminal a web page for setting a security level, and the web browser of the terminal may set a security level on the Web page and transmit it to the web server.

Upon being requested to print, the printer driver prompts the user to enter authentication information (user name and password), and adds the entered authentication information to printing data before transmitting the printing data to the printer.

Upon receiving the printing data from the terminal 2 through the network 3, the printer 1 performs processing to print the printing data.

The printer 1 has a job history memory 4 which stores information relating to print processing carried out by the printer 1 (e.g., a job name, user name, print-out result, and number of pages) as a job history, a security level setting section 5 which sets a security level for the display of the job history list, and a job history list display controller 6 which controls the display of the job history list according to the security level.

A description will now be made on the control of the display of a job history list that is done according to a single security level set for the entire printer, with reference to a specific example.

FIG. 2 is a diagram illustrating an example of job histories stored in the job history memory 4 of the printer.

As shown in FIG. 2, all the job histories include information relating to a job name, a user name, a print-out result, a number of pages, and other information (hereafter, these shall be referred to as the "job history items"). The symbol "-", that is entered in the fields for the job name and the user name of the job No. 5 and the job No. 7, indicates that the job name and the user name have been set as confidential.

FIG. 3 is a diagram illustrating an example of a table associating security levels set for the display of a job history list of the entire printer with methods of displaying the job history items.

The security level setting section 5 is preliminarily provided with a table as shown in FIG. 3.

As shown in FIG. 3, the security level 1 is the lowest security level and level 7 is the highest. The administrator of the printer presets one of the security levels for the display of the job history list by using an operation panel or the like of the printer or by a remote control through a terminal.

For example, it is assumed that the administrator selects level 2 as the security level. In level 2, the job name is displayed directly, and the user name is also displayed directly. Other users' job names are displayed by being masked with "@", while other users' names are respectively replaced with "a" and so on. Job names and user names indicated by the symbol "-" are displayed directly as "-", and other information items are displayed directly.

It is further assumed that a user called FUJI Taro tries to obtain display of a job history list on a terminal by the use of a remote control unit. When the user enters authentication information through the remote control unit, a job history as shown in FIG. 4 is displayed on the terminal. The user is not required to enter the authentication information every time the job history list is displayed, if the remote control unit is able to automatically read the authentication information that is set in the printer driver. When the security level of the printer is set to level 1, all the items of the job history are displayed to any user. In contrast, when the security level is set to level 7, no item of the job history at all is displayed to any user. Therefore, the user is not prompted to enter the authentication information when the security level is set to level 1 or 7.

FIG. 4 is a diagram illustrating an example of a job history list.

As shown in FIG. 4, all the items of the job histories of the print jobs processed by FUJI Taro (the jobs No. 10, NO. 9 and No. 4 shown in FIG. 2) are displayed directly. All the items of the job histories in which the job name and the user name are set as confidential (the jobs No. 7 and No. 5 in FIG. 2) are also displayed directly. Job histories of other users' jobs (the jobs No. 8, No. 6, No. 3, No. 2 and No. 1 in FIG. 2) are displayed with the job names being masked with "1", and with the user names being replaced with "a", "b", and "c", respectively, while the other items are displayed directly.

Since the security level is set rather low at level 2, the user, FUJI Taro is allowed to know the existence of other users' job histories from the job history list of FIG. 4. Although the other users' names are respectively replaced with the characters such as "a" and so on, FUJI Taro is able to know that the jobs No. 3 and No. 1 are of the same user because the user names of the jobs No. 3 and No. 1 are both "user-a".

Accordingly, if the user himself/herself desires to raise the security level set by the administrator, he/she is able to raise the security level by using the remote control unit.

FIG. 5 is a diagram illustrating an example of setting of a security level with the use of the remote control unit.

As shown in FIG. 5, the user is allowed to select a desired level from a combo box for setting a security level, and the level thus set is set as the security level for the to the entire printer. However, since the security level is preset to level 2 by the administrator of the printer, the user is not allowed to select a level lower than level 2 (that is, level 1). Therefore, as shown in FIG. 5, only levels 2 to 7 are available as options in the pull down menu of the combo box.

For example, it is assumed that the user selects level 6 as the security level (the job names are displayed directly; the user name is displayed directly; other users' job names are not displayed; other users' names are not displayed; the job names and the user names indicated by "-" are not displayed; and other information is not displayed). When a job history list is displayed again after setting the security levels as described above, a job history list as shown in FIG. 6 is displayed on the terminal.

FIG. 6 is a diagram illustrating an example of the job history list.

As shown in FIG. 6, there are displayed only the job histories of the print jobs processed by FUJI Taro (the jobs No. 10, NO. 9 and No. 4 in FIG. 2), while no other job history is displayed.

A description will now be made on the control of the display of a job history list according to security levels set for the respective job history items, with reference to a specific example.

FIG. 7 is a diagram illustrating an example of a table associating the security levels set for the item "job name" with the display methods.

The security level setting section 5 is preliminarily provided with a table as shown in FIG. 7.

As shown in FIG. 7, level 1 is the lowest security level, and level 8 is the highest. The administrator of the printer presets one of the security levels for the display of the item "job name" by using an operation panel or the like of the printer or by remote control through a terminal.

FIG. 8 is a diagram illustrating an example of a table associating the security levels for the item "job name" with display methods thereof.

The security level setting section is preliminarily provided with a table as shown in FIG. 8.

As shown in FIG. 8, level 1 is the lowest security level, and level 8 is the highest. The administrator of the printer presets one of the security levels for the display of the item "user name" by using an operation panel or the like of the printer or by remote control through a terminal.

FIG. 9 is a diagram illustrating an example of a table associating security levels for other items (e.g., "print-out result", "number of pages", and "other information") with display methods thereof.

The security level setting section is preliminarily provided with a table as shown in FIG. 9.

As shown in FIG. 9, level 1 is the lowest security level, and level 8 is the highest. The administrator of the printer presets security levels for the display of the other items by using an operation panel or the like of the printer or by remote control through a terminal.

FIG. 10 is a diagram illustrating an example of setting of security levels for respective items with the use of the remote control unit.

As shown in FIG. 10, the administrator or the user is able to select a desired level to be set for each item from the respective combo boxes for setting the security levels, and the levels selected here are set as the security levels for the respective items.

For example, it is assumed that the administrator has selected the security levels for the respective items as described below. Level 2 is selected as the security level for the item "job name", so that job names of the user himself/herself and job names indicated by "-" are displayed directly, and job names of other users are displayed with the characters being masked with the symbol "@". Level 1 is selected as the security level for the item "user name", so that all the information is displayed directly. Level 1 is selected as the security level for the item "print-out result" so that all the information is displayed directly. Level 1 is selected as the security level for the item "number of pages" so that all the information is displayed directly. Level 1 is selected as the security level for the information A to I so that all the information is displayed directly. Level 8 is selected as the security level for information J so that this item is not displayed at all.

It is further assumed that a user called FUJI Taro tries to obtain display of a job history list on a terminal by the use of a remote control unit. When the user enters authentication information through the remote control unit, a job history as shown in FIG. 11 is displayed on the terminal.

FIG. 11 is a diagram illustrating an example of a job history list.

As shown in FIG. 11, all the items are displayed directly for the job histories of the print jobs processed by the user, FUJI Taro, namely the jobs No. 10, NO. 9 and No. 4 shown in FIG. 2. All the items are displayed directly for the job histories in which the items "job name" and "user name" are set as confidential, namely the jobs No. 7 No. 5 in FIG. 2. The job histories of other users' jobs, namely the jobs No. 8, No. 6, No. 3, No. 2 and No. 1 in FIG. 2 are and displayed with the job names being masked with "@", while the other items including "user name" are displayed directly. Since level 8 is set as the security level for the information J, the item itself is not displayed at all.

Since the security levels are set rather low for the items, namely level 2 for "job name" and level 1 for other items, FUJI Taro is allowed to know from the job history list shown in FIG. 11 the existence of other users' job histories.

If the user desires to raise the security level set by the administrator, the user is able to do so by using the remote control unit.

FIG. 12 is a diagram illustrating an example of setting of security levels with the use of the remote control unit.

As shown in FIG. 12, the user is able to select a desired level to be set for each item from the respective combo boxes for setting the security levels, and the levels selected here are set as the security levels for the respective items. However, the user is not allowed to set the security level to a level lower than the level set by the administrator of the printer. This means that level 1 cannot be set for the "job name" and a level lower than level 7 cannot be set for the information J.

For example, it is assumed that the user sets the security levels for the respective items as follows. Level 2 is set as the security level for "job name" so that the job names of jobs of the user himself/herself and those indicated by "-" are displayed directly, while the job names of other users are mask-displayed with the characters being replaced with "@". Level 4 is set as the security level for "user name" so that the name of the user himself/herself is displayed, user names indicated by "-" are not displayed, and names of other users are mask-displayed by being respectively replaced with "a", "b", "c", and so on. Level 4 is set as the security level for "print-out result" so that the print-out results of jobs performed by the user himself/herself are displayed, those of the jobs corresponding to the user names indicated by "-" are not displayed, and those of the jobs corresponding to other users' names are mask-displayed by being respectively replaced with "a", "b", "c" and so on. Level 3 is set as the security level for "number of pages" so that the number of pages of jobs of the user himself/herself and those of the jobs corresponding to the user names indicated by "-" are displayed directly, while those of the jobs corresponding to other users' names are displayed by being masked with "@" (including spaces). Level 8 is set as the security level for the information A to J so that no information is displayed at all. When a job history list is displayed again after the setting as described above, a job history list as shown in FIG. 13 is displayed on the terminal.

FIG. 13 is a diagram illustrating an example of a job history list.

As shown in FIG. 13, the job histories of the print jobs processed by FUJI Taro, namely the jobs No. 10, NO. 9 and No. 4 in FIG. 2 are displayed directly, and those of the jobs for which the items "job name" and "user name" are set as confidential, namely the jobs No. 7 and No. 5 in FIG. 2 are not displayed, and the job histories of other uses' jobs, namely the jobs No. 8, No. 6, No. 3, No. 2 and No. 1 in FIG. 2 are mask-displayed with the job names being replaced with "@", the user names of other users being respectively replaced with "a", "b", and "c", the print-out results of the other users being respectively replaced with "a", "b", and "c", and the numbers of pages being replaced with "@". Since level 8 is set as the security level for the information A to J, the items of information A to J themselves are not displayed at all.

Since level 4 is set as the security level for the item "user name", the user names indicated by "-" are not displayed. As the result, the security level for the item "job name" practically becomes level 4 even though level 2 is set by the user.

Thus, the security level can be set to a high level to prevent the job histories from being accessed by any person other than the persons concerned, whereby the security can be ensured to protect privacy information of all the users.

A description will now be made on the processing for controlling the display of a job history list according to security levels, with reference to FIGS. 14 to 28.

Figure 14:
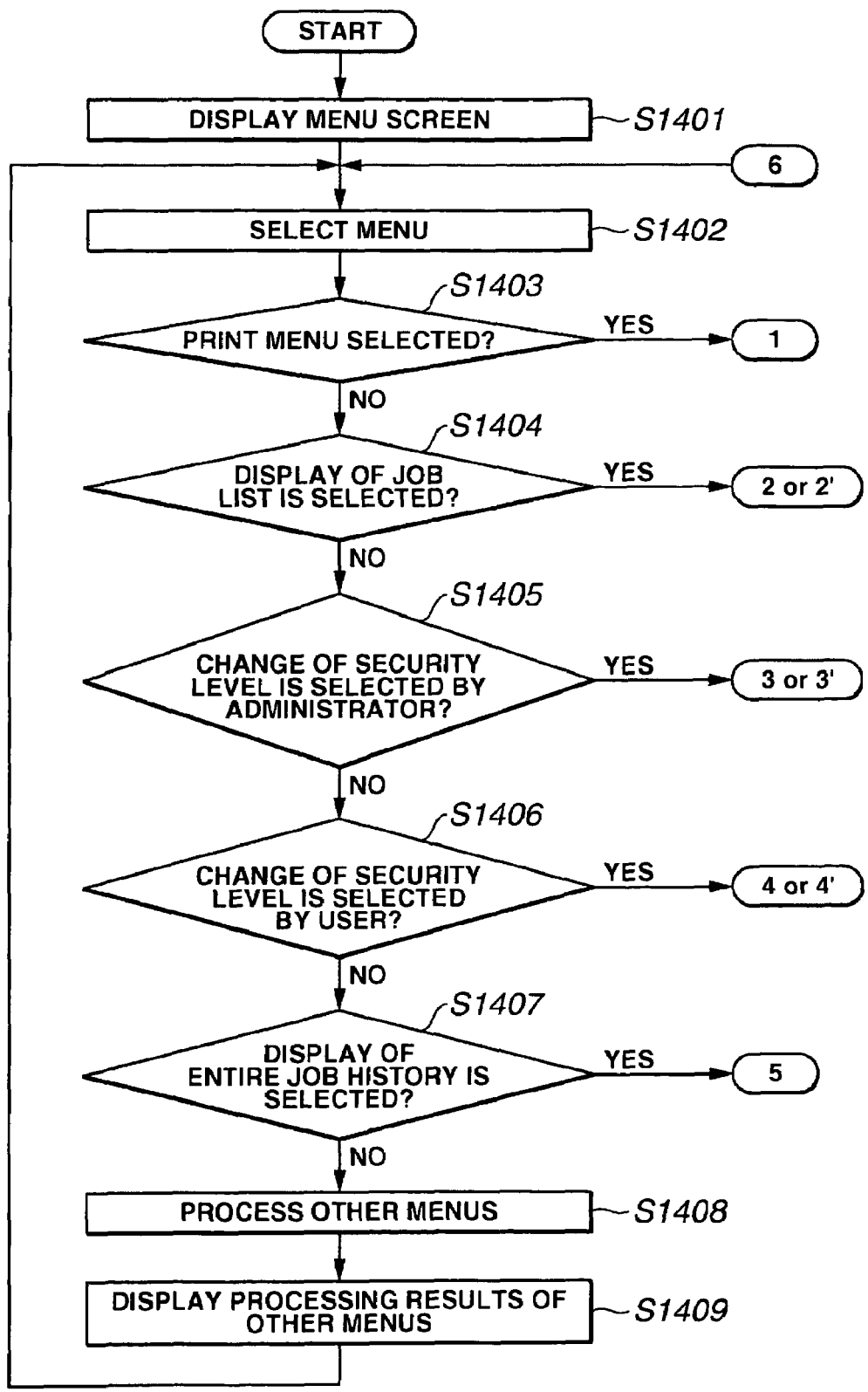
FIG. 14 is a flowchart illustrating processing to select a menu with the use of a remote control unit.

FIG. 14 is a flowchart illustrating the processing steps to select a menu with the use of the remote control unit.

The remote control unit displays a menu screen (step S1401), and the user selects a desired menu from the menu screen (step S1402).

Figure 15:
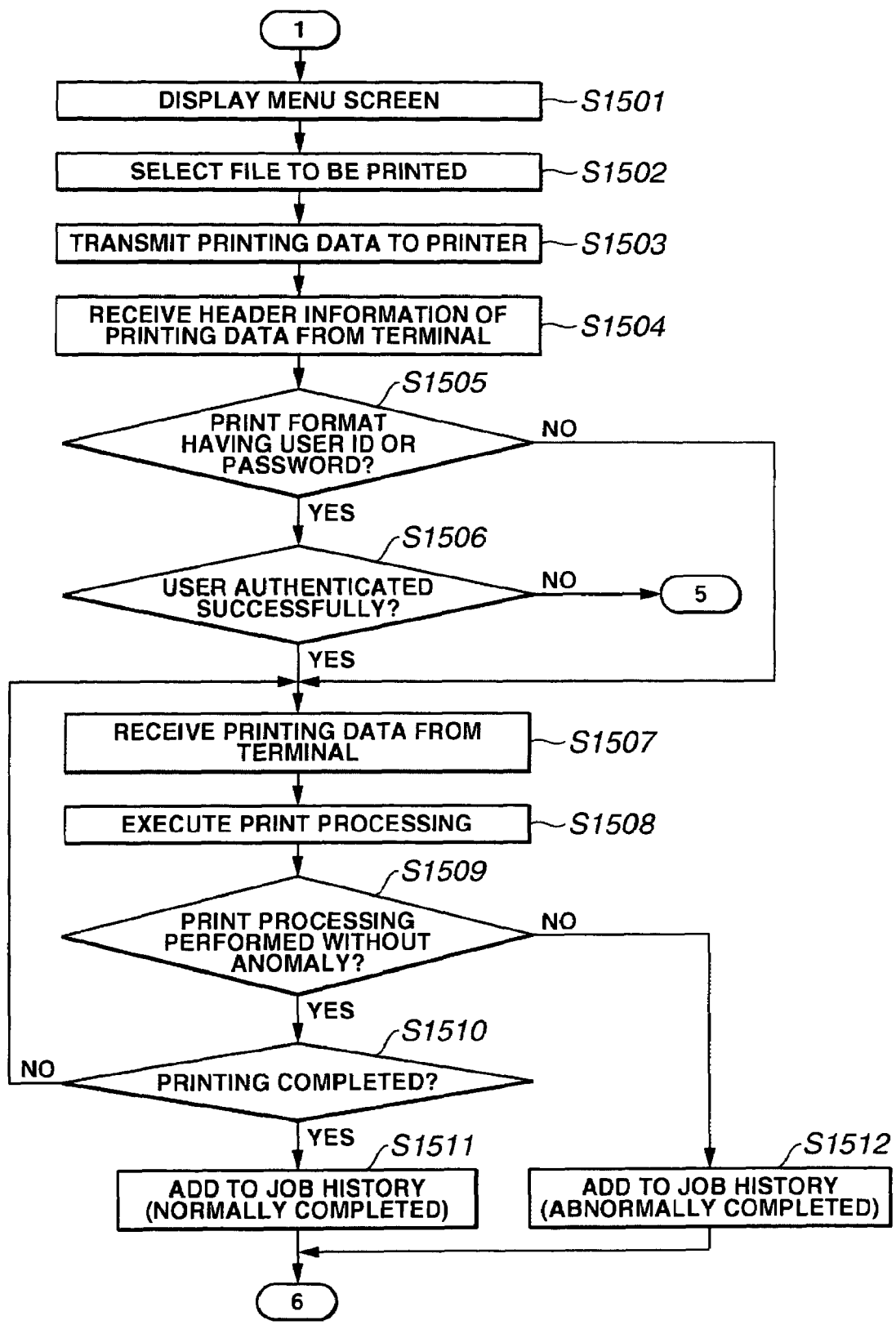
FIG. 15 is a flowchart when the print menu is selected in step S1403 in FIG. 14.

When the print menu is selected (YES in step S1403), the processing proceeds to the flowchart of FIG. 15.

Figure 16:
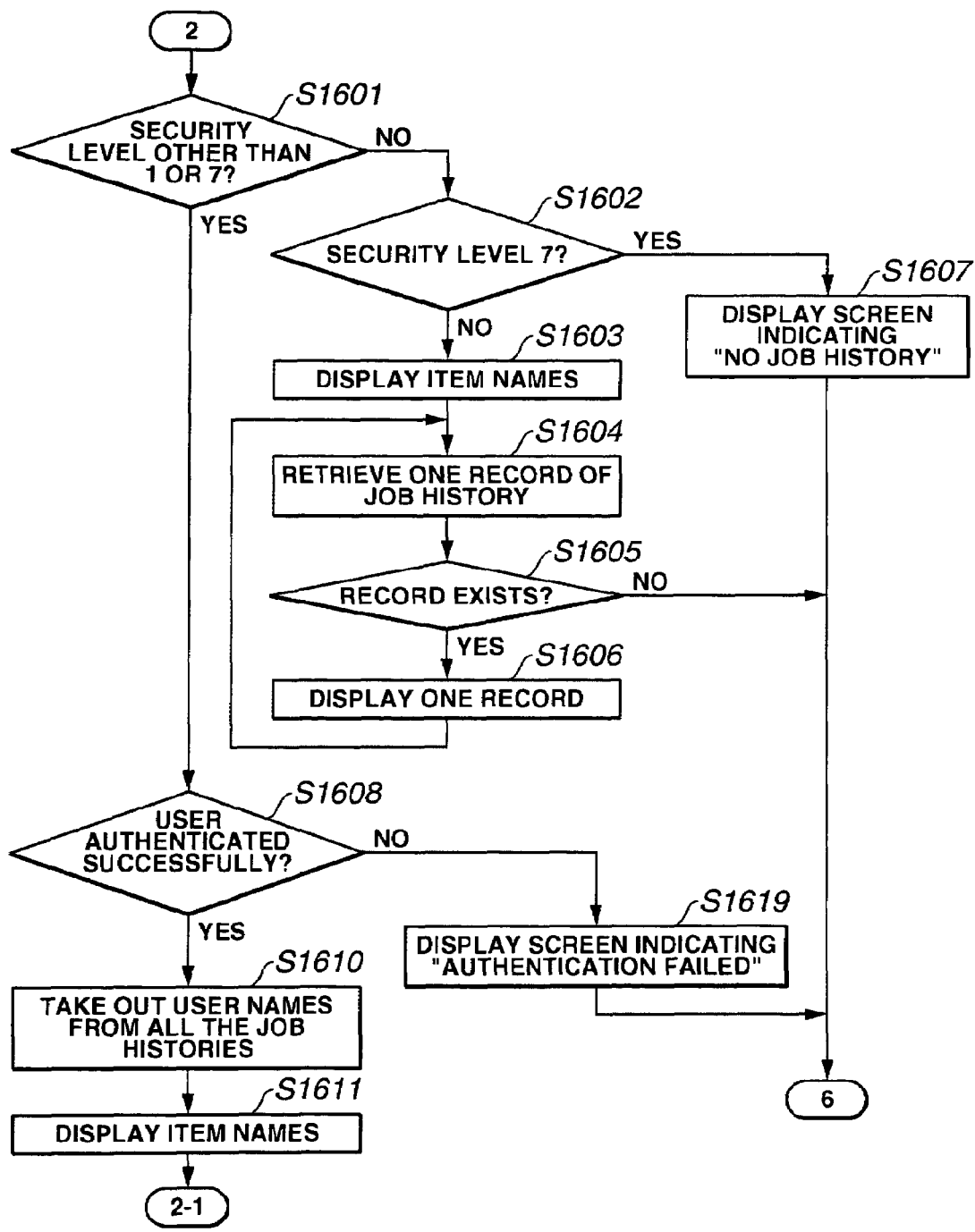
FIG. 16 is a flowchart when the display of a job history list is selected in step S1404 in the flowchart of FIG. 14, and a security level is set for the entire printer.
Figure 18:
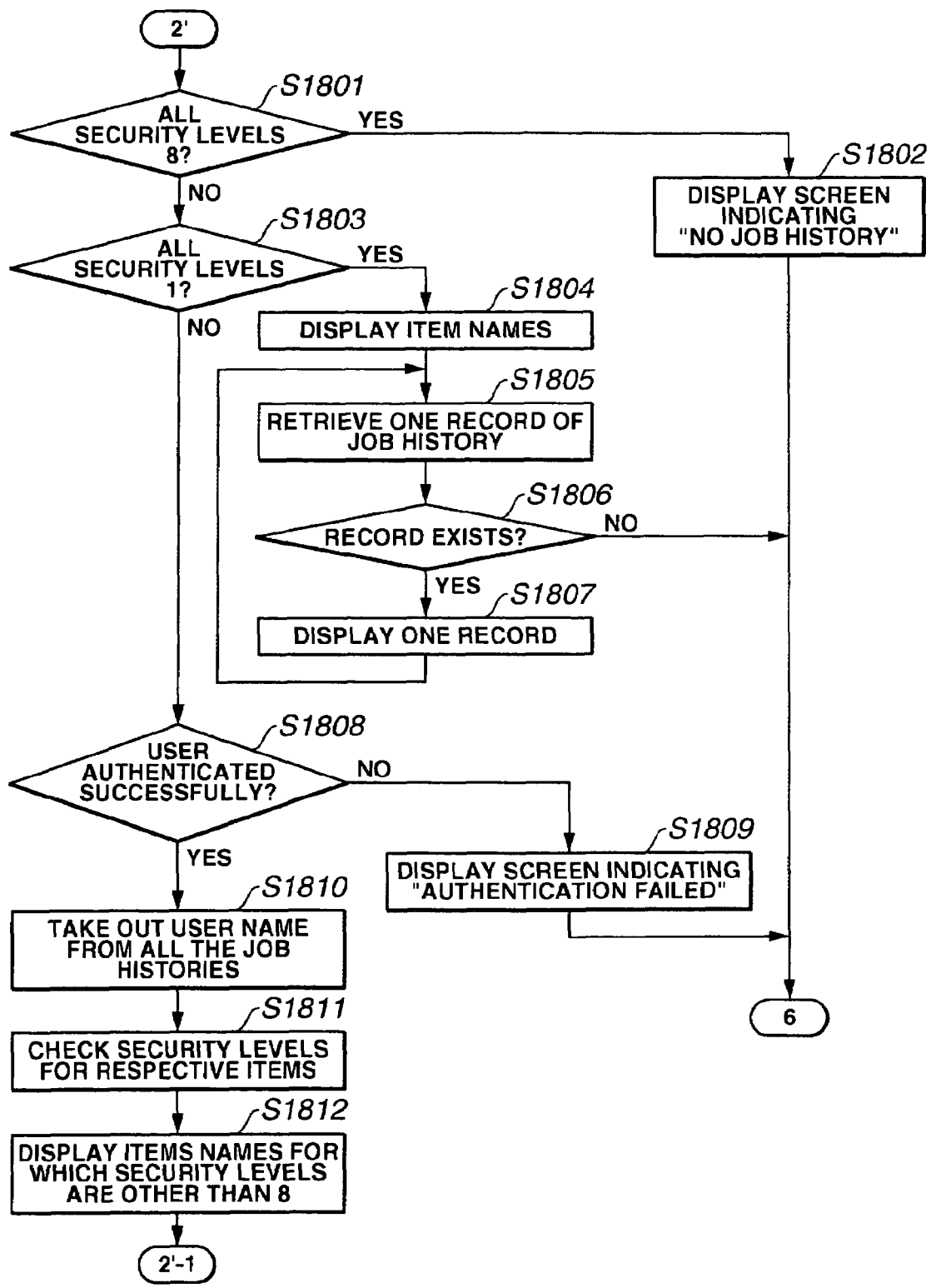
FIG. 18 is a flowchart when the display of a job history list is selected in step S1404 in the flowchart of FIG. 14, and a security level is set for each item of the job history.

When the display of a job history list is selected (YES in step S1404), the processing proceeds to the flowchart of FIG. 16 if a security level is set for the entire printer, whereas the processing proceeds to the flowchart of FIG. 18 if a security level is set for each item of the job histories.

Figure 24:
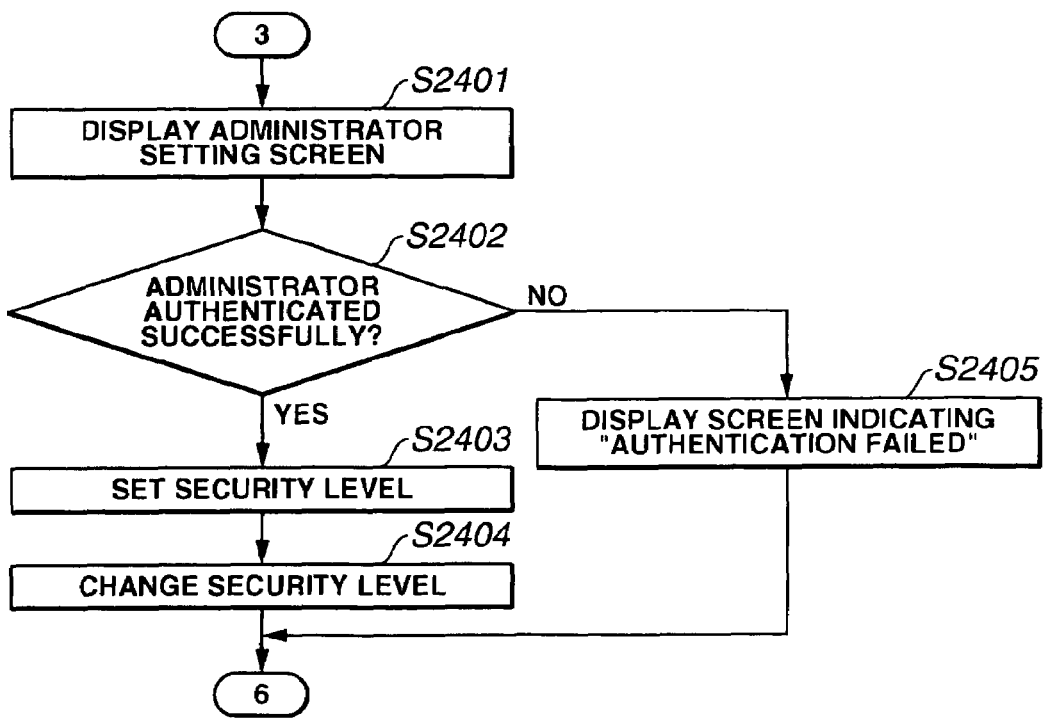
FIG. 24 is a flowchart when change of the security level is selected by the administrator in step S1405 in the flowchart of FIG. 14, and the security level is set for the entire printer.
Figure 25:
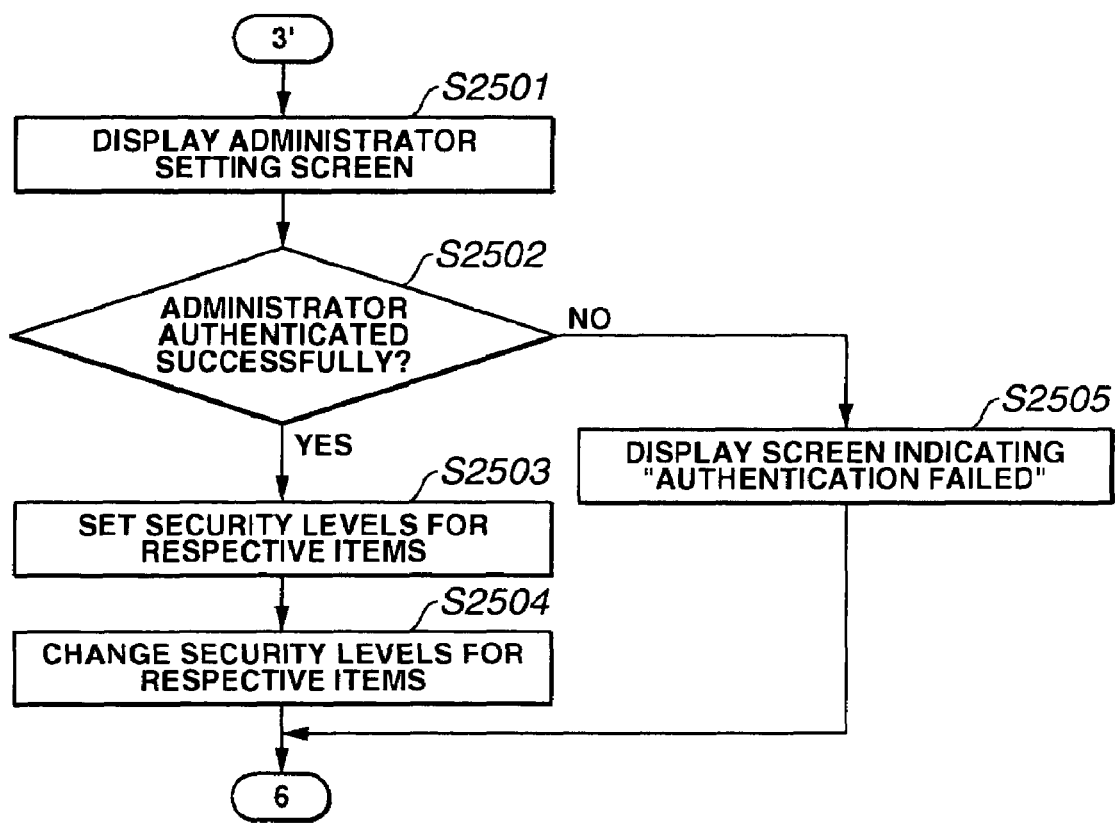
FIG. 25 is a flowchart when change of the security level is selected by the administrator in step S1405 in the flowchart of FIG. 14, and the security level is set for each item of the job history.

When the change of the security level is selected by the administrator (YES in step S1405), the processing proceeds to the flowchart of FIG. 24 if the security level is set for the entire printer, whereas the processing proceeds to the flowchart of FIG. 25 if a security level is set for each item of the job histories.

Figure 26:
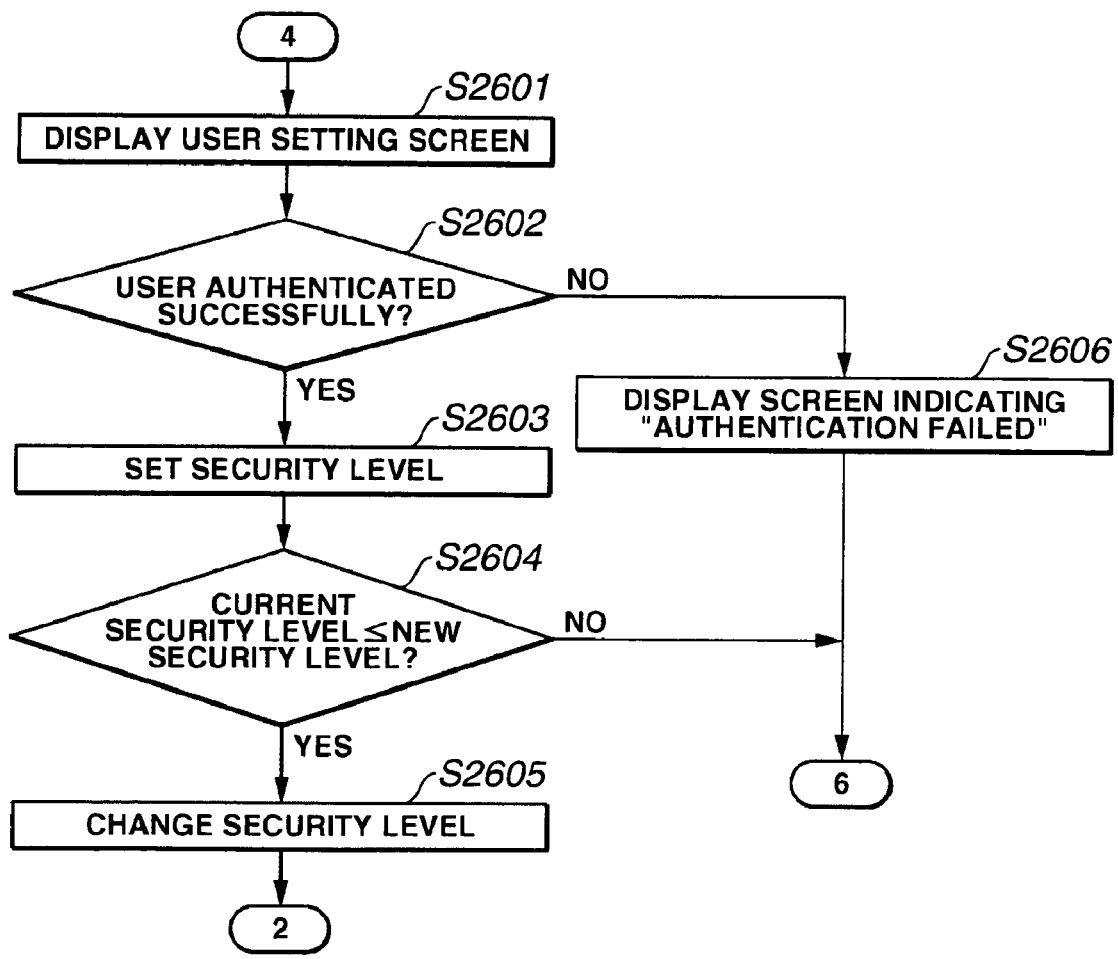
FIG. 26 is a flowchart when change of the security level is selected by the user in step S1406 in the flowchart of FIG. 14, and the security level is set for the entire printer.
Figure 27:
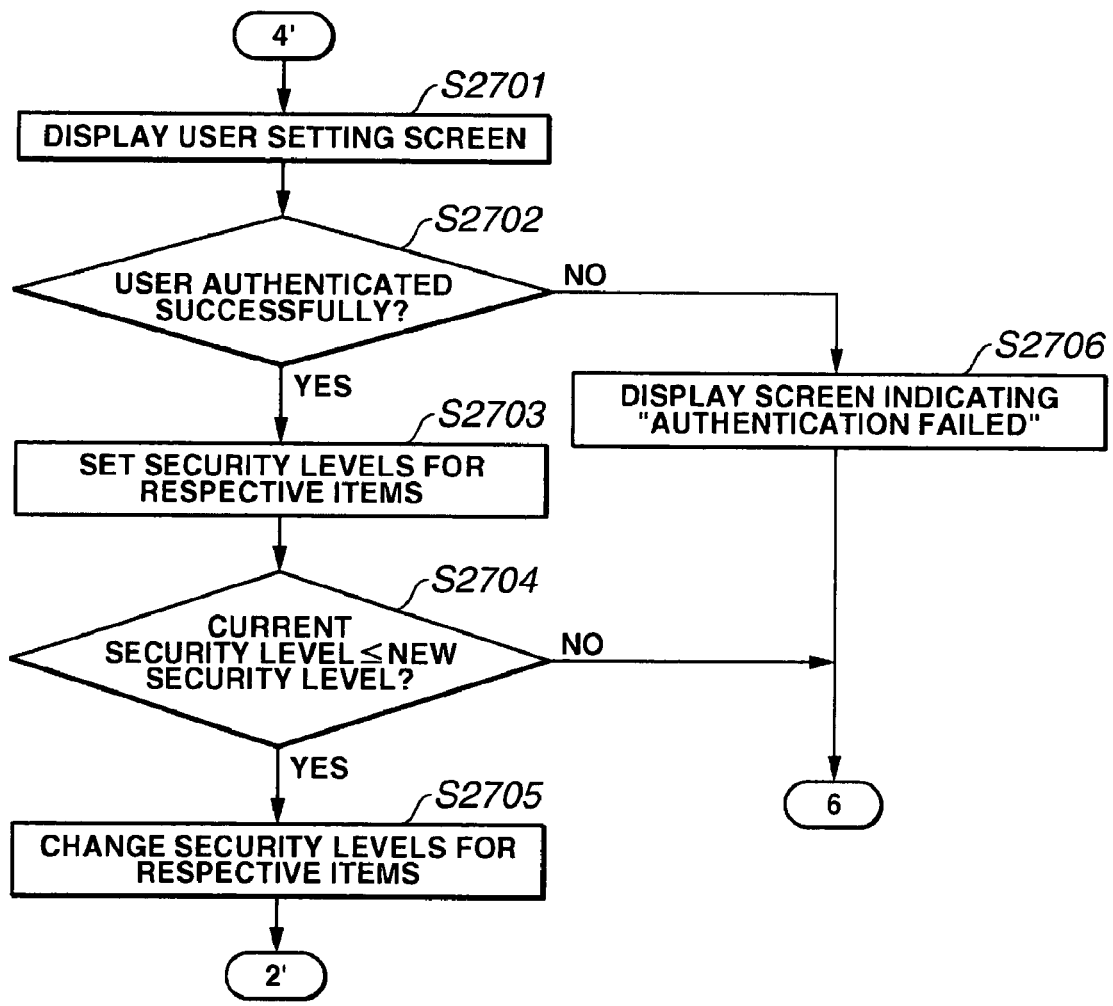
FIG. 27 is a flowchart when change of the security level is selected by the user in step S1406 in the flowchart of FIG. 14, and a security level is set for each item of the job history.

When the change of the security level is selected by the user (YES in step S1406), the processing proceeds to the flowchart of FIG. 26 if the security level is set for the entire printer, whereas the processing proceeds to the flowchart of FIG. 27 if a security level is set for each item of the job histories.

Figure 28:
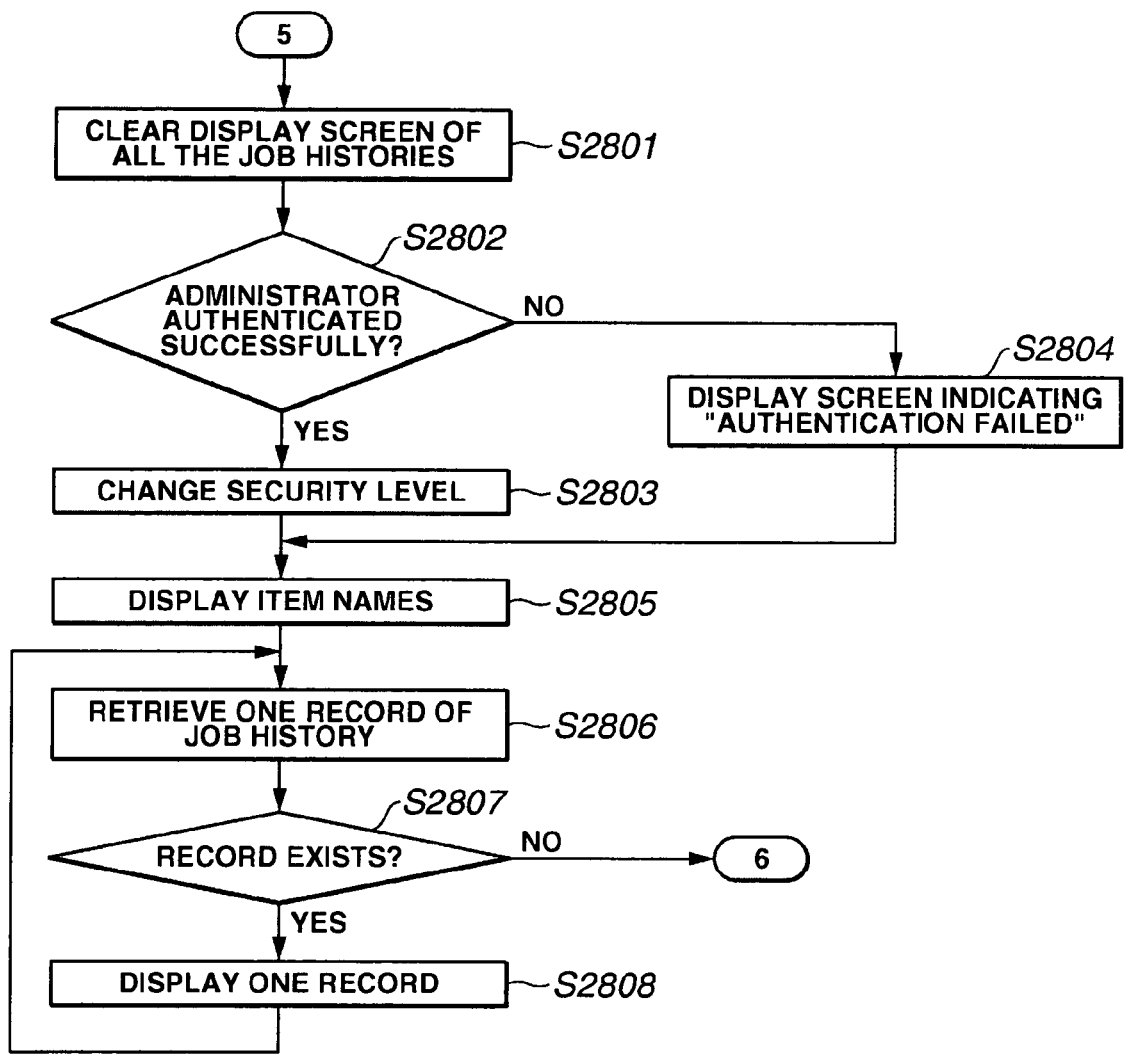
FIG. 28 is a flowchart when display of the entire job history list is selected by the administrator in step S1407 in the flowchart of FIG. 14.

When the display of the list of all the job histories is selected by the administrator (YES in step S1407), the processing proceeds to the flowchart of FIG. 28.

When any other menu is selected (NO in steps S1403 to S1407), the selected menu is processed (step S1408), and the processing result of the menu is displayed (step S1409). The processing then returns to step S1402.

FIG. 15 shows a flowchart when the print menu is selected in step S1403 of the flowchart of FIG. 14.

The remote control unit displays the print menu screen (step 1501), the user selects a print file from the print menu screen (step S1502), and the printing data is transmitted to the printer (step S1503).

The printer receives header information of the printing data from the terminal (step S1504). When the printing data is of a print format having a user ID and a password (YES in step S1505), the processing proceeds to step S1506. When the printing data is of a print format not having a user ID or a password (NO in step S1505), the processing proceeds to step S1507.

When the printing data is of a print format having a user ID and a password (YES in step S1505), the user authentication is performed (step S1506). If the user is authenticated successfully (YES in step S1506), the processing proceeds to step S1507. If the user cannot be authenticated (NO in step S1506), the processing returns to step S1402 of the flowchart of FIG. 14.

The printer then receives the printing data from the terminal (step S1507), and executes the print processing (step S1508). If the print processing has been performed without anomaly (YES in step S1509), the processing proceeds to step S1510. Whereas, if any anomaly occurs during the print processing (NO in step S11509), the processing proceeds to step S1512.

If the print processing has been performed without anomaly (YES in step S1509), and the printing is completed (YES in step S1510), the print processing result (normally terminated) is added to the job history (step S1511) and the processing is terminated.

When an anomaly occurs during the print processing (NO in step S1509), the result of the print processing (abnormally terminated) is added to the job history (step S1512), and the processing is terminated.

FIG. 16 is a flowchart illustrating the processing steps performed when the display of a job history list is selected in step S1404 of flowchart of FIG. 14, and a security level is set for the entire printer.

The printer checks the security level set for the entire printer (step S1601). If the security level is set to level 1 or 7 (NO in step S1601), the processing proceeds to step S1602. If the security level is set to a level other than levels 1 and 7 (YES in step S1601), the processing proceeds to step S1608.

When the security level is set to level 1 or 7 (NO in step S1601), the processing proceeds to step S1603 if the security level is set to level 1 (NO in step S1602). Whereas, if the security level is set to level 7 (YES in step S11602), the processing proceeds to step S1607.

If the security level is set to level 1 (NO in step S11602), the item names of the job history list are displayed (step S1603), and one record of the job history is retrieved (step S1604). If a record exists (YES in step S1605), the processing proceeds to step S1606. If no record exists (NO in step S1605), the processing returns to step S1402 of the flowchart of FIG. 14.

When a record exists (YES in step S1605), the one record is displayed (step S1606), and the processing returns to step S1604.

If the security level is set to level 7 in step S11602 (YES in step S1602), a screen indicating "no job history" is displayed (step S1607), and the processing returns to step S1402 of the flowchart of FIG. 14.

When the security level is set to a level other than levels 1 and 7 in step S1601 (YES in step S1601), the user authentication is performed (step S1608). If the user cannot be authenticated (NO in step S1608), the processing proceeds to step S1609. If the user is authenticated successfully (YES in step S1608), the processing proceeds to step S1610.

When the user cannot be authenticated (NO in step S1608), a screen indicating "authentication failed" is displayed (step S1609), and the processing returns to step S1402 of the flowchart of FIG. 14.

When the user is authenticated successfully (YES in step S1608), user names are taken out from all the job histories (step S1610), and the item names are displayed (step S1611). The processing then proceeds to step S1701 of the flowchart shown in FIG. 17.

A description will now be made on the flowchart of FIG. 17.

One record of the job history is retrieved (step S1701). If a record exists (YES in step S1702), the processing proceeds to step S1703. Whereas, if no record exists (NO in step S1702), the processing returns to step S1402 of the flowchart of FIG. 14.

When a record exists (YES in step S1702), it is checked whether the user name is indicated by "-" and the security level is set to level 6 (step S1703). If the user name is indicated by "-" and the security level is set to level 6 (YES in step S1703), the processing returns to step S1701. Whereas, if the user name is indicated by "-" and the security level is not set to level 6 (NO in step S1703), the processing proceeds to step S1704.

When the user name is indicated by "-" and the security level is not set to level 6 (NO in step S1703), it is checked whether the user name is a name of any other user and the security level is set to level 6 or 5 (step S11704). If the user name is another user's name and the security level is set to level 6 or 5 (YES in step S1704), the processing returns to step S1701. Whereas, if the user name is another user's name and the security level is not set to level 6 or 5 (NO in step S1704), the processing proceeds to step S1705.

When the user name is another user's name and the security level is not set to level 6 or 5 (NO in step S1704), it is checked whether the user name is a user ID of the authentication information or indicated by "-" (step S1705). If the user name is neither a user ID of the authentication information nor a user name indicated by "-" (YES in step S1705), the processing proceeds to step S1706. Whereas, if the user name is a user ID of the authentication information or indicated by "-" (NO in step S1705), the processing proceeds to step S1713.

When the user name is neither a user ID of the authentication information nor a user name indicated by "-" (YES in step S11705), it is checked whether the security level is set to level 4 (step S11706). If the security level is not set to level 4 (NO in step S1706), the processing proceeds to step S1707. If the security level is set to level 4 (YES in step S1706), the processing proceeds to step S1712.

When the security level is not set to level 4 (NO in step S11706), it is checked whether or not the security level is set to level 3 (step S1707). If the security level is not set to level 3 (NO in step S1707), the processing proceeds to step S1708. Whereas, if the security level is set to level 3 (YES in step S1707), the processing proceeds to step S1709.

When the security level is not set to level 3 (NO in step S11707), the job name is rewritten with "@" (step S1708), and the processing proceeds to step S1710.

When the security level is set to level 3 (YES in step S1707), the field for the job name is filled with "@" (step S1709), and the processing proceeds to step S1710.

Then, an anonymous ID is acquired from the user name (this processing will be described later with reference to the flowchart shown in FIG. 23) (step S1710), and the user name is replaced with "user-"+the anonymous ID (step S1711). The processing then proceeds to step S1713.

When the security level is set to level 4 in step S1706 (YES in step S1706), the fields for the job name and user name are filled with "@" (step S1712), and the processing proceeds to step S1713.

Subsequently, one record of the job history is displayed (step S1713), and the processing returns to step S1701.

FIG. 18 is a flowchart illustrating the processing steps performed when the display of a job history list is selected in step S1404 in the flowchart of FIG. 14, and a security level is set for each item of the job history.

The printer checks the security levels for all the items (step S1801), and if all the security levels are set to level 8 (YES in step S1801), the processing proceeds to step S1602. Whereas, if not all the security levels are set to level 8 (NO in step S1601), the processing proceeds to step S1603.

When all the security levels are set to level 8 (YES in step S1801), a screen indicating "no job history" is displayed (step S1802), and the processing returns to step S1402 of the flowchart of FIG. 14.

When not all the security levels are set to level 8 (NO in step S1801), it is checked whether or not the security levels for the items are all set to level 1 (step S1803). If all the security levels are set to level 1 (YES in step S11803), the processing proceeds to step S1804. Whereas, if not all the security levels are set to level 1 (NO in step S1803), the processing proceeds to step S1808.

When all the security levels are set to level 1 (YES in step S11803), the item names of the job history list are displayed (step S1804), and one record of the job history is retrieved (step S1805). If a record exists (YES in step S1806), the processing proceeds to step S1807. Whereas, if no record exists (NO in step S1806), the processing returns to step S1402 of the flowchart of FIG. 14.

When a record exists (YES in step S1806), the one record is displayed (step S1907), and the processing returns to step S1805.

When not all the security levels are set to level 1 in step S1803 (NO in step S1803), the user authentication is performed (step S1808). If the user cannot be authenticated (NO in step S1808), the processing proceeds to step S180. Whereas, if the user is authenticated successfully (YES in step S11808), the processing proceeds to step S1810.

When the user cannot be authenticated (NO in step S1808), a screen indicating that the authentication has failed is displayed (step S1809), and the processing returns to step S1402 of the flowchart of FIG. 14.

When the user is authenticated successfully (YES in step S1808), the user name is taken out from all the job histories (step S1810), and the security levels set for the respective items are checked (step S1811). The item names for which the security level is set to a level other than level 8 are displayed (step S1812), and the processing proceeds to step S1901 of the flowchart shown FIG. 19.

A description will now be made on the flowchart shown in FIG. 19.

One record of the job history is retrieved (step S1901), and if a record exists (YES in step S1902), the processing proceeds to step S1903. Whereas, if no record exists (No in step S1902), the processing returns to step S1402 of the flowchart of FIG. 14.

When a record exists (YES in step S1902), the display buffer of the one record is cleared (step S1903), and the display content of the job name is added to the display buffer (this processing will be described later with reference to the flowchart of FIG. 20) (step S1904). The display content of the user name is also added to the display buffer (this processing will be described later with reference to the flowchart of FIG. 21) (step S1905), and the display contents of designated items are added to the display buffer (this processing will be described later with reference to the flowchart of FIG. 22) (step S1906). The one record is then displayed (step S1907), and the processing returns to step S1901.

Figure 19:
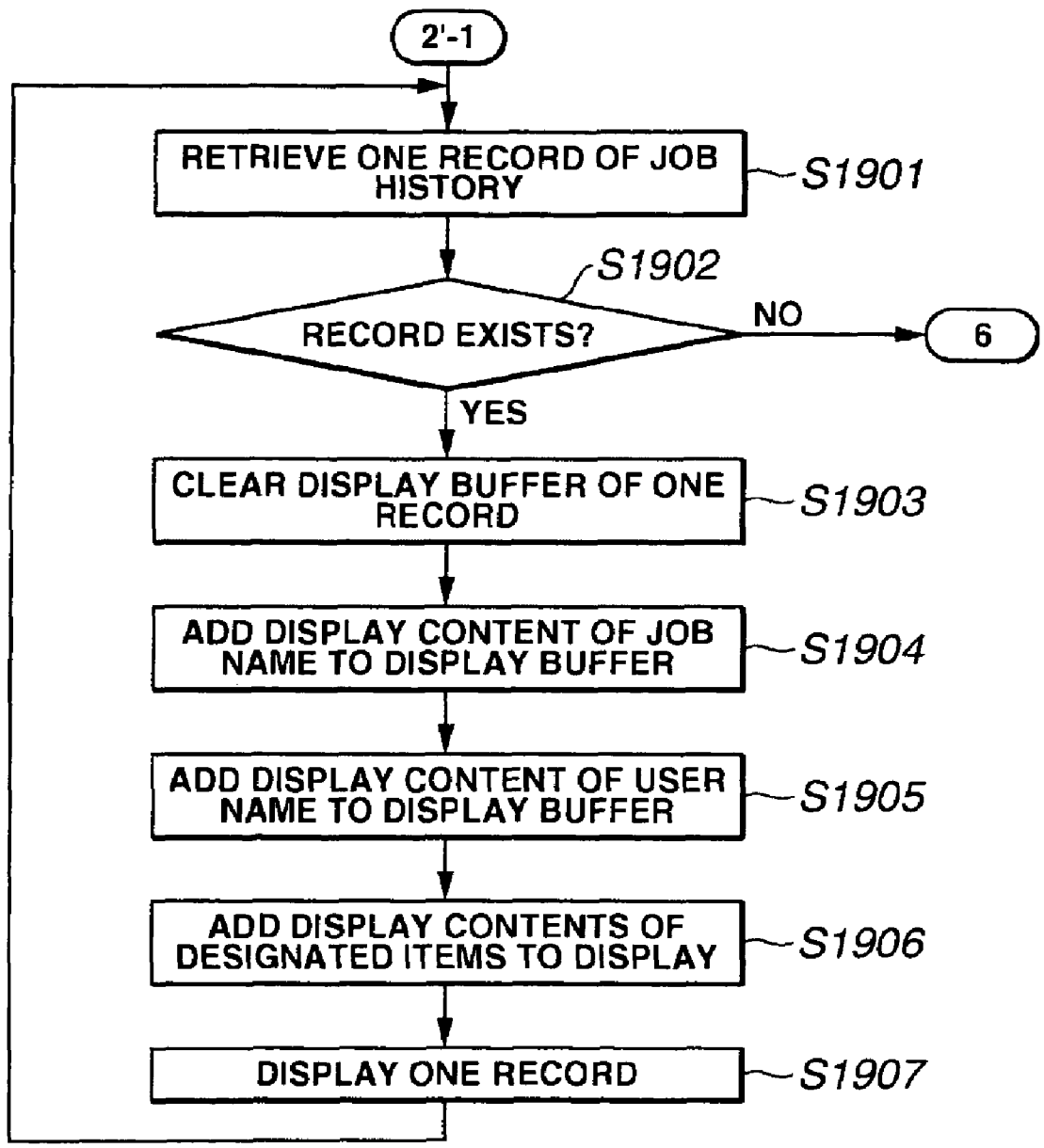
FIG. 19 is a flowchart when the display of a job history list is selected in step S1404 in the flowchart of FIG. 14, and a security level is set for each item of the job history.
Figure 20:
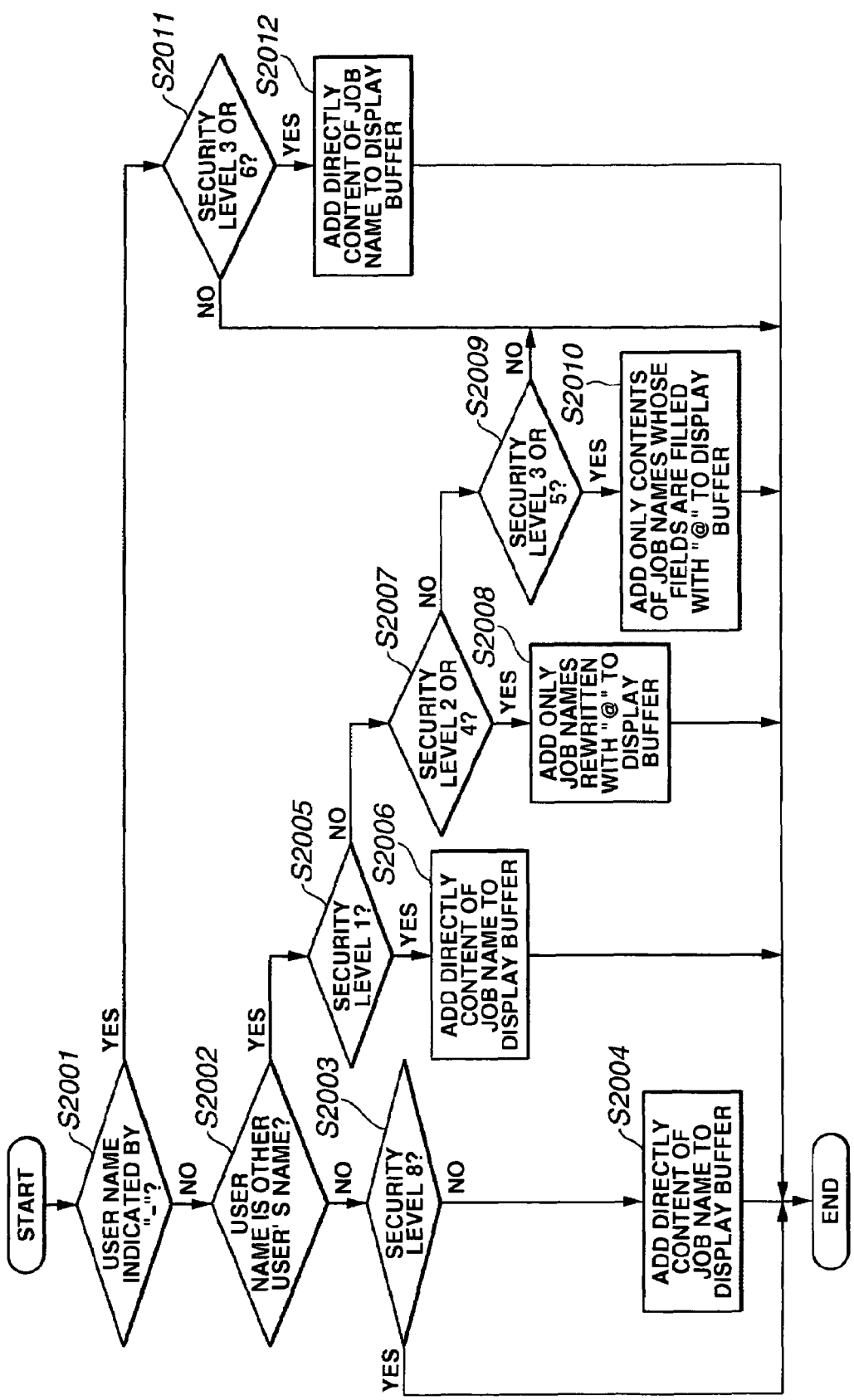
FIG. 20 is a flowchart illustrating the processing steps to add the display contents of job names to the display buffer in step S11904 in the flowchart of FIG. 19.

FIG. 20 is a flowchart illustrating the processing steps to add the display contents of the job names to the display buffer in step S1904 of the flowchart of FIG. 19.

It is checked the user name is indicated by "-" (step S2001), and if the user name is not indicated by "-" (NO in step S2001), the processing proceeds to step S2002. Whereas, if the user name is indicated by "-" (YES in step S2001), the processing proceeds to step S2011.

When the user name is not indicated by "-" (NO in step S2001), it is checked whether or not the user name is another user's name (step S2002). If the user name is not another user's name (NO in step S2002), the processing proceeds to step S2003. Whereas, if the user name is another user's name (YES in step S2002), the processing proceeds to step S2005.

When the user name is not another user's name (NO in step S2002), it is checked whether or not the security level is set to level 8 (step S2003). If the security level is not set to level 8 (NO in step S2003), the processing proceeds to step S2004, whereas if the security level is set to level 8 (YES in step S2003), the processing is terminated.

When the security level is not set to level 8 (NO in step S2003), the content of the job name is directly added to the display buffer (step S2004), and the processing is terminated.

When the user name is another user's name in step S2002 (YES in step S2002), it is checked whether or not the security level is set to level 1 (step S2005). When the security level is set to level 1 (YES in step S2005), the processing proceeds to step S2006, whereas if the security level is not set to level 1 (NO in step S2005), the processing proceeds to step S2007.

When the security level is set to level 1 (YES in step S2005), the content of the job name is directly added to the display buffer (step S2006), and the processing is terminated.

When the security level is not set to level 1 (No in step S2005), it is checked whether or not the security level is set to level 2 or 4 (step S2007). If the security level is set to level 2 or 4 (YES in step S2007), the processing proceeds to step S2008. Whereas, if the security level is not set to level 2 or level 4 (NO in step S2007), the processing proceeds to step S2009.

When the security level is set to level 2 or 4 (YES in step S2007), only those job names to be rewritten with "@" are added to the display buffer (step S2008), and the processing is terminated.

When the security level is not set to level 2 or level 4 (NO in step S2007), it is checked whether or not the security level is set to level 3 or 5 (step S2009). If the security level is set to level 3 or 5 (YES in step S2009), the processing proceeds to step S2010. Whereas, if the security level is not set to level 3 or level 5 (NO in step S2009), the processing is terminated.

When the security level is set to level 3 or level 5 (YES in step S2009), only those job names to be masked with "®" are added to the display buffer (step S2010), and the processing is terminated.

When the user name is indicated by "-" in step 2001 (YES in step S2001), it is checked whether or not the security level is set to level 3 or level 6 (step S2011). If the security level is set to level 3 or level 6 (YES in step S2011), the processing proceeds to step S2012. Whereas, if the security level is not set to level 3 or level 6 (NO in step S2011), the processing is terminated.

When the security level is set to level 3 or level 6 (YES in step S2011), the content of the job name is directly added to the display buffer (step S2012), and the processing is terminated.

Figure 21:
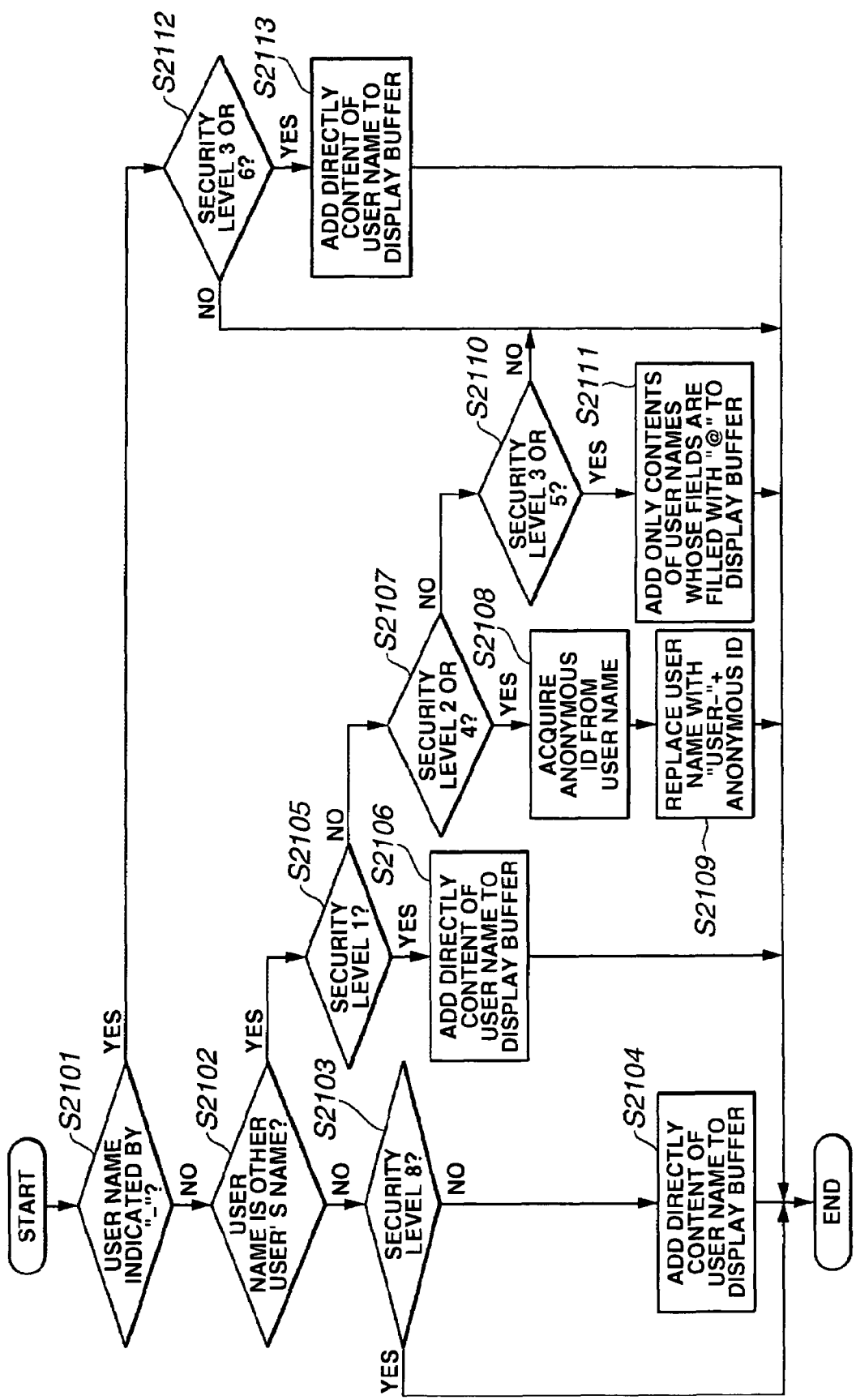
FIG. 21 is a flowchart illustrating the processing steps to add the contents of user names to be displayed to the display buffer in step S1905 in the flowchart of FIG. 19.

FIG. 21 is a flowchart illustrating the processing steps to add the display content of the user name to the display buffer in step S1905 of the flowchart of FIG. 19.

It is checked whether or not the user name is indicated by "-" (step S2101), and if the user name is not indicated by "-" (NO in step S2101), the processing proceeds to step S2102. Whereas, if the user name is indicated by "-" (YES in step S2101), the processing proceeds to step S2112.

When the user name is not indicated by "-" (NO in step S2101), it is checked whether or not the user name is another user's name (step S2102), and if the user name is not another user's name (NO in step S2102), the processing proceeds to step S2103. Whereas, if the user name is another user's name (YES in step S2102), the processing proceeds to step S2105.

When the user name is not another user's name (NO in step S2101), it is cheeked whether or not the security level is set to level 8 (step S2103), and if the security level is not set to level 8 (NO in step S2103), the processing proceeds to step S2104. Whereas, if the security level is set to level 8 (YES in step S2103), the processing is terminated.

When the security level is not set to level 8 (NO in step S2103), the content of the user name is directly added to the display buffer (step S2104), and the processing is terminated.

When the user name is another user's name in step S2102 (YES in step S2102), it is checked whether or not the security level is set to level 1 (step S2105). If the security level is set to level 1 (YES in step S2105), the processing proceeds to step S2106. Whereas, if the security level is not set to level 1 (NO in step S2105), the processing proceeds to step S2107.

When the security level is set to level 1 (YES in step S2105), the content of the job name is directly added to the display buffer (step S2106), and the processing is terminated.

When the security level is not set to level 1 (NO in step S2105), it is checked whether or not the security level is set to level 2 or 4 (step S2107). If the security level is set to level 2 or 4 (YES in step S2107), the processing proceeds to step S2108. Whereas, if the security level is not set to level 2 or 4 (NO in step S2107), the processing proceeds to step S2110.

When the security level is set to level 2 or 4 (YES in step S2107), an anonymous ID is acquired from the user name (this processing will be described later with reference to the flowchart of FIG. 23) (step 2108), and the job name is replaced with "user-"+the anonymous ID (step S2109), and the processing is terminated.

When the security level is not set to level 2 or 4 (NO in step S2107), it is checked whether or not the security level is set to level 3 or 5 (step S2110), and if the security level is set to level 3 or 5 (YES in step S2110), the processing proceeds to step S2111. Whereas, if the security level is not set to level 3 or 5 (NO in step S2110), the processing is terminated.

When the security level is set to level 3 or 5 (YES in step S2110), only those job names for which the job name fields are to be filled with "@" are added to the display buffer (step S2111), and the processing is terminated.

When the user name is indicated by "-" in step 2101 (YES in step S2101), it is checked whether or not the security level is set to level 3 or level 6 (step S2112). If the security level is set to level 3 or level 6 (YES in step S2112), the processing proceeds to step S2113. Whereas, if the security level is not set to level 3 or level 6 (NO in step S2112), the processing is terminated.

When the security level is set to level 3 or level 6 (YES in step S2112), the content of the user name is directly added to the display buffer (step S2113), and the processing is terminated.

Figure 22:
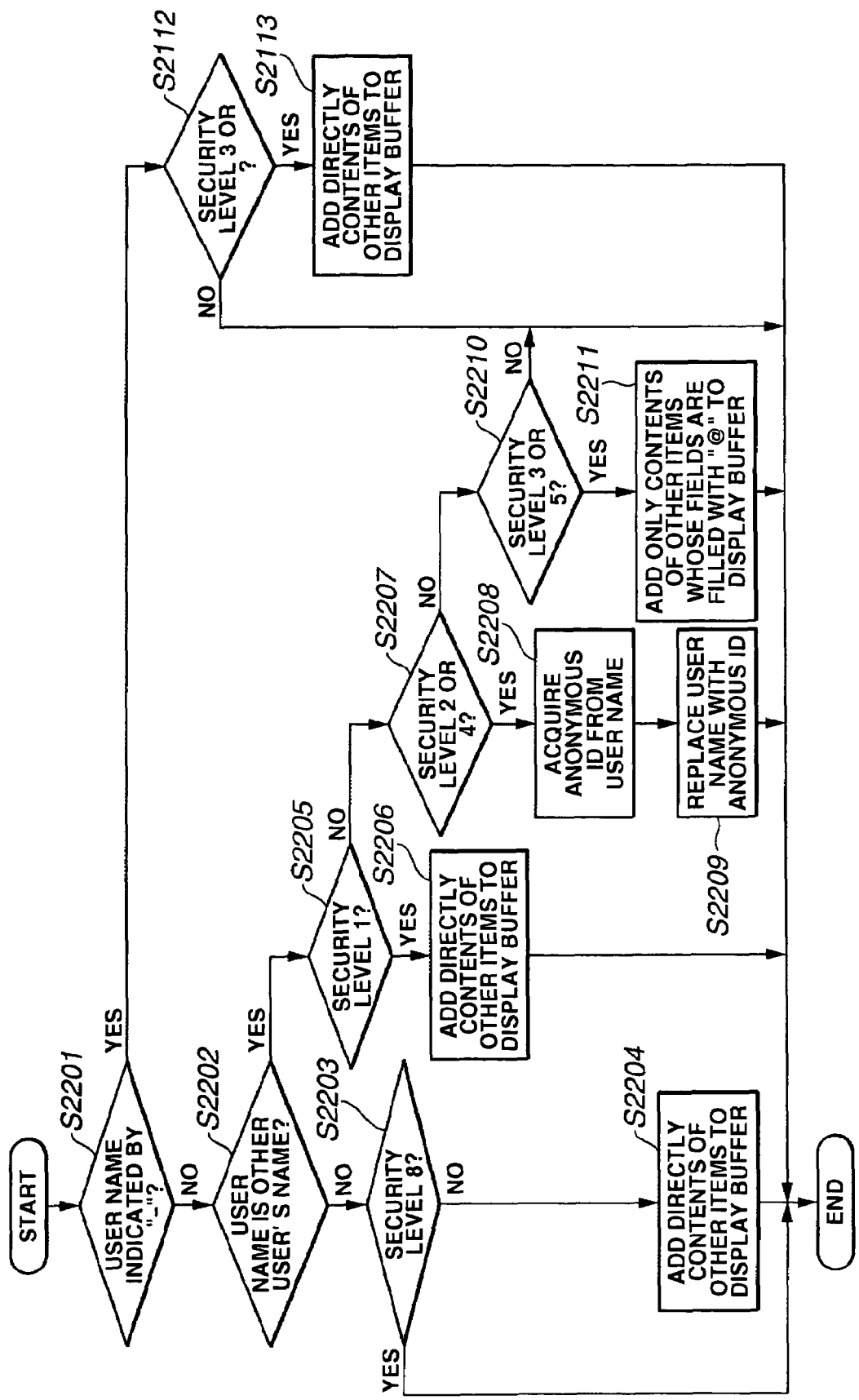
FIG. 22 is a flowchart illustrating the processing steps to add the display contents of designated items to the display buffer in step S1906 in the flowchart of FIG. 19.

FIG. 22 is a flowchart illustrating the processing steps to add the display contents of designated items to the display buffer in step S1906 of FIG. 19.

It is checked whether the user name is indicated by "-" (step S2201), and if the user name is not indicated by "-" (NO in step S2201), the processing proceeds to step S2202. Whereas, if the user name is indicated by "-" (YES in step S2201), the processing proceeds to step S2212.

When the user name is not indicated by "-" (NO in step S2201), it is checked whether or not the user name is another user's name (step S2202). If the user name is not another user's name (NO in step S2202), the processing proceeds to step S2203. Whereas, if the user name is another user's name (YES in step S2202), the processing proceeds to step S2205.

When the user name is not another user's name (NO in step S2202), it is checked whether or not the security level is set to level 8 (step S2203). If the security level is not set to level 8 (NO in step S2203), the processing proceeds to step S2204. Whereas, if the security level is set to level 8 (YES in step S2203), the processing is terminated.

When the security level is not set to level 8 (NO in step S2203), the contents of the other items are directly added to the display buffer (step S2204), and the processing is terminated.

When the user name is another user's name in step S2202 (YES in step S2202), it is checked whether or not the security level is set to level 1 (step S2205). If the security level is set to level 1 (YES in step S2205), the processing proceeds to step S2206. Whereas, if the security level is not set to level 1 (NO in step S2205), the processing proceeds to step S2207.

When the security level is set to level 1 (YES in step S2205), the contents of the other items are directly added to the display buffer (step S2206), and the processing is terminated.

When the security level is not set to level 1 (NO in step S2205), it is checked whether or not the security level is set to level 2 or 4 (step S2207). If the security level is set to level 2 or 4 (YES in step S2207), the processing proceeds to step S2208. Whereas, if the security level is not set to level 2 or 4 (NO in step S2207), the processing proceeds to step S2210.

When the security level is set to level 2 or 4 (YES in step S2207), an anonymous ID is acquired from the user name (this processing will be described later with reference to the flowchart of FIG. 23) (step 2208). The user name is replaced with the anonymous ID (step S2209), and the processing is terminated.

When the security level is not set to level 2 or 4 (NO in step S2207), it is checked whether or not the security level is set to level 3 or 5 (step S2210). If the security level is set to level 3 or 5 (YES in step S2210), the processing proceeds to step S2211. Whereas, if the security level is not set to level 3 or 5 (NO in step S2210), the processing is terminated.

When the security level is set to level 3 or 5 (YES in step S2210), only those other items for which the fields are to be filled with "(" are added to the display buffer (step S2211), and the processing is terminated.

In step 2201, if the user name is indicated by "-" (YES in step S2201), it is checked whether or not the security level is set to level 3 or level 6 (step S2212). If the security level is set to level 3 or level 6 (YES in step S2212), the processing proceeds to step S2213. Whereas, if the security level is not set to level 3 or level 6 (NO in step S2212), the processing is terminated.

When the security level is set to level 3 or level 6 (YES in step S2212), the contents of the other items are directly added to the display buffer (step S2213), and the processing is terminated.

Figure 17:
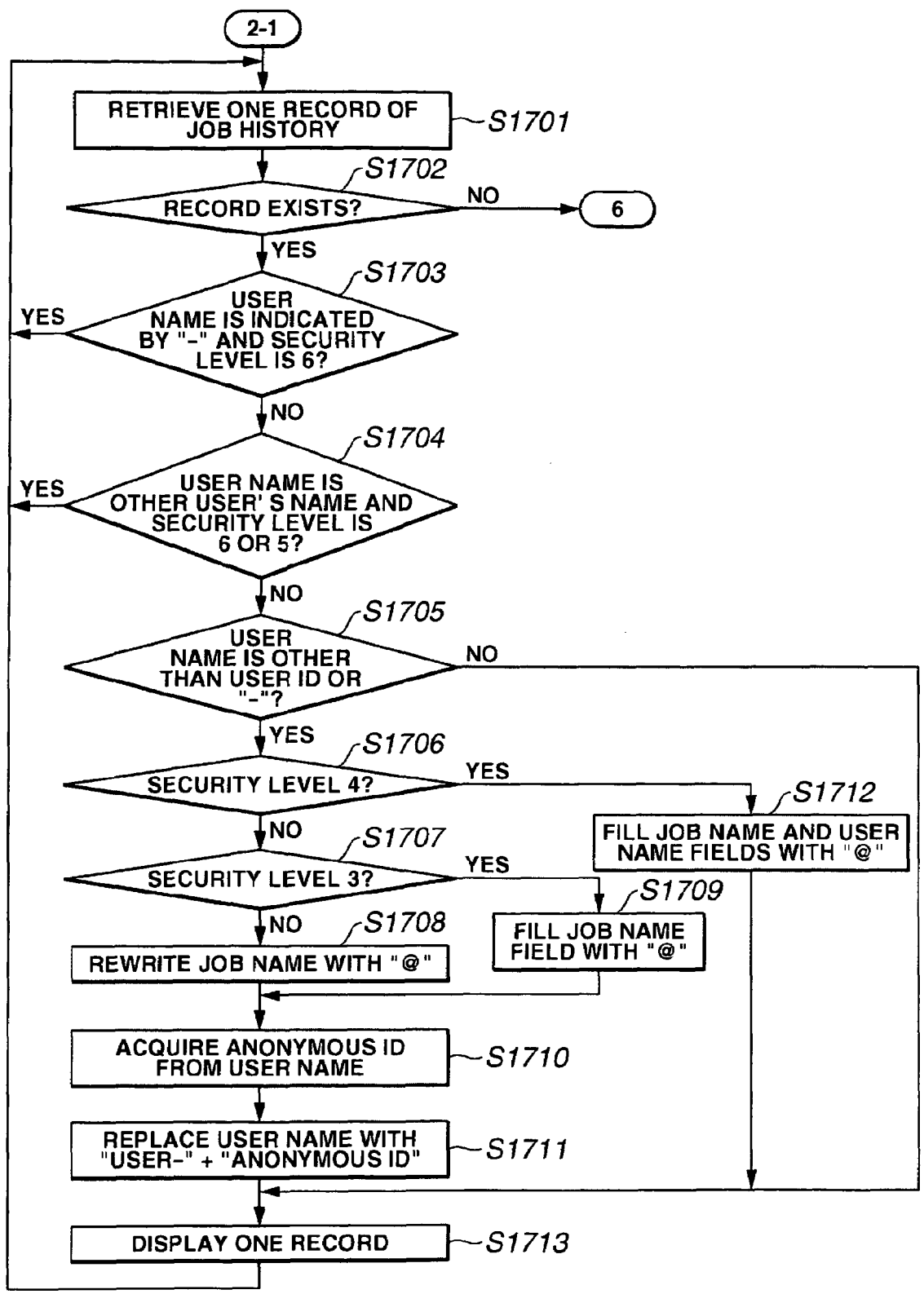
FIG. 17 is a flowchart when the display of a job history list is selected in step S1404 in the flowchart of FIG. 14, and a security level is set for the entire printer.
Figure 23:
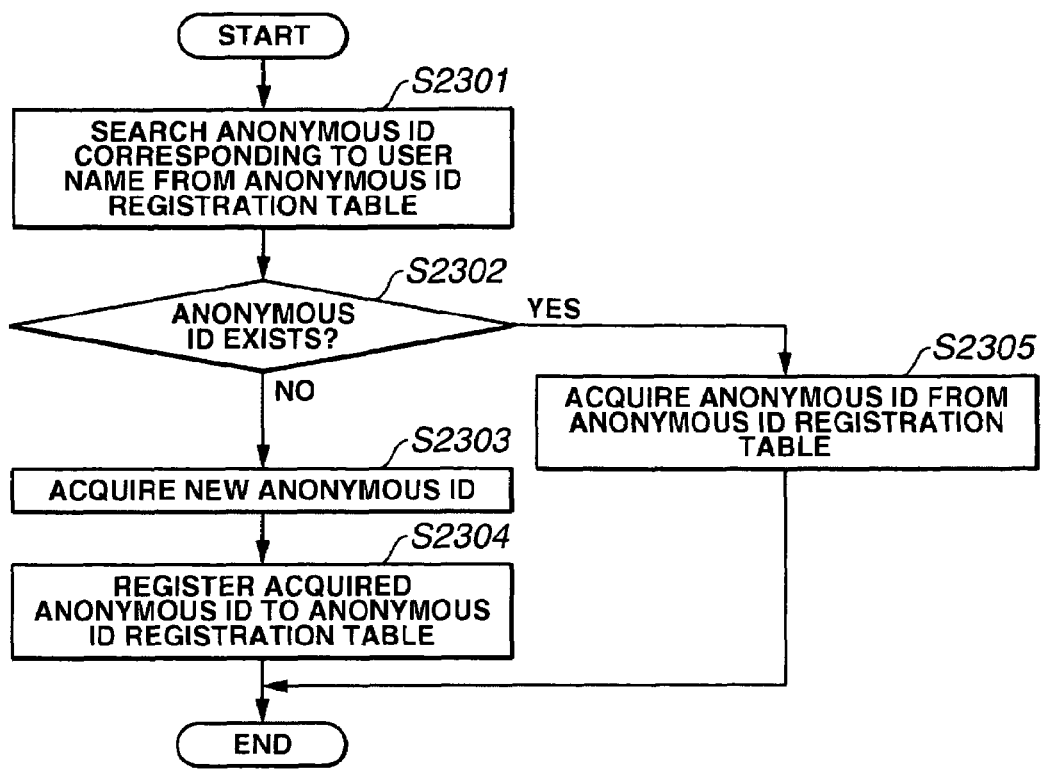
FIG. 23 is a flowchart illustrating the processing steps to acquire an anonymous ID from the user name in step S1711 in the flowchart of FIG. 17, step S2108 in the flowchart of FIG. 21, and step S2208 in the flowchart of FIG. 22.

FIG. 23 is a flowchart illustrating the processing steps to acquire an anonymous ID from the user name in step S1711 of the flowchart of FIG. 17, in step S2108 of the flowchart of FIG. 21, and in step S2208 of the flowchart of FIG. 22.

An anonymous ID corresponding to the user name is searched in an anonymous ID registration table (step S2301), and it is checked whether or not an anonymous ID is registered in the table (step S2302). If there is no anonymous ID registered (NO in step S2302), the processing proceeds to step S2303. Whereas, if there is an anonymous ID registered in the table (YES in step 2302), the processing proceeds to step S2305.

When there is no anonymous ID registered (NO in step S2302), a new anonymous ID is acquired (step S2303). The anonymous ID thus acquired is registered in the anonymous ID registration table (step S2304), and the processing is terminated.

When there is an anonymous ID registered (YES in step 2302), the anonymous ID is acquired from the anonymous ID registration table (step S2305), and the processing is terminated.

FIG. 24 is a flowchart illustrating the processing steps performed when the change of the security level is selected by the administrator in step S1405 of the flowchart of FIG. 14, and a security level is set for the entire printer.

The remote control unit displays an administrator setting screen (step S2401), and the authentication of the administrator is performed (step S2402). If the administrator is authenticated successfully (YES in step S2402), the processing proceeds to step S2403. Whereas, if the administrator cannot be authenticated (NO in step S2402), the processing proceeds to step S2405.

When the administrator is authenticated successfully (YES in step S2402), a security level is set for the entire printer (step S2403), the set security level is changed (step S2404), and the processing returns to step S1402 of the flowchart of FIG. 14.

When the administrator cannot be authenticated (NO in step S2402), a screen indicating that the authentication has failed (step S2405), and the processing returns to step S1402 of the flowchart of FIG. 14.

FIG. 25 is a flowchart illustrating the processing steps performed when the change of the security level is selected by the administrator in step S11405 of the flowchart of FIG. 14, and a security level is set for each item of the job history.

The remote control unit displays an administrator setting screen (step S2501), and the administrator authentication is performed (step S2502). If the administrator is authenticated successfully (YES in step S2502), the processing proceeds to step S2503. Whereas, if the administrator cannot be authenticated (NO in step S2502), the processing proceeds to step S2505.

When the administrator is authenticated successfully (YES in step S2502), a security level is set for each item (step S2503). The security level set for each item is changed (step S2504), and the processing returns to step S1402 of the flowchart of FIG. 14.

When the administrator cannot be authenticated (NO in step S2502), a screen indicating that the authentication has failed is displayed (step S2505), and the processing returns to step S1402 of the flowchart of FIG. 14.

FIG. 26 is a flowchart illustrating the processing steps performed when the change of the security level is selected by the user in step S1406 of the flowchart of FIG. 14, and a security level is set for the entire printer.

The remote control unit displays a user setting screen (step S2601), and the user authentication is performed (step S2602). If the user is authenticated successfully (YES in step S2602), the processing proceeds to step S2603. Whereas, if the user cannot be authenticated (NO in step S2602), the processing proceeds to step S2406.

When the user is authenticated successfully (YES in step S2602), a security level is set for the entire printer (step S2603). If the security level thus set is higher than the current security level set by the administrator (YES in step S2604), the processing proceeds to step S2605. Whereas, if the set security level is lower than the current security level set by the administrator (NO in step S2604), the processing returns to step S1402 of the flowchart of FIG. 14.

When the set security level is higher than the current security level set by the administrator (YES in step S2604), the set security level is changed (step S2605), and the processing proceeds to step S1601 of the flowchart of FIG. 16.

When the user cannot be authenticated (NO in step S2602), a screen indicating that the authentication has failed is displayed (step S2606), and the processing returns to step S1402 of the flowchart of FIG. 14.

FIG. 27 is a flowchart illustrating the processing steps performed when the change of the security level is selected by the user in step S1406 of the flowchart of FIG. 14, and a security level is set for each item of the job history.

The remote control unit displays a user setting screen (step S2701), and the user authentication is performed (step S2702). If the user is authenticated successfully (YES in step S2702), the processing proceeds to step S2703. Whereas, if the user cannot be authenticated (NO in step S2702), the processing proceeds to step S2706.

When the user is authenticated successfully (YES in step S2702), a security level is set for each item (step S2703). If the security level thus set is higher than the current security level set by the administrator (YES in step S2704), the processing proceeds to step S2705. Whereas, if the set security level is lower than the current security level set by the administrator (NO in step S2704), the processing returns to step S1402 of the flowchart of FIG. 14.

When the set security level is higher than the current security level set by the administrator (YES in step S2704), the security level set for each item is changed (step S2705), and the processing proceeds to step S1801 of the flowchart of FIG. 18.

When the user cannot be authenticated (NO in step S2702), a screen indicating that the authentication has failed is displayed (step S2706), and the processing returns to step S1402 of the flowchart of FIG. 14.

FIG. 28 is a flowchart illustrating the processing steps performed when the display of the list of all the job histories is selected by the administrator in step S1407 of the flowchart of FIG. 14.

The screen displaying all the job histories is cleared (step S2801), and the administrator authentication is performed (step S2802). If the administrator is authenticated successfully (YES in step S2802), the processing proceeds to step S2803. Whereas, if the administrator cannot be authenticated (NO in step S2802), the processing proceeds to step S2804.

When the administrator is authenticated successfully (YES in step S2802), the security level set for the entire printer is changed to level 1 (step S2803), and the processing proceeds to step S2805.

When the administrator cannot be authenticated (NO in step S2802), a screen indicating that the authentication has failed is displayed (step S2804), and the processing proceeds to step S2805.

The item names are then displayed (step S2805), and one record of the job history is retrieved (step S2806). If a record exists (YES in step S2807), the processing proceeds to step S2808. Whereas, if no record exists (NO in step S2807), the processing returns to step S1402 of the flowchart of FIG. 14.

When a record exists (YES in step S2807), the one record is displayed (step S2808), and the processing returns to step S2806.

As described above, according to a first aspect of the present invention, a device for performing a processing in response to a request received from a requester, comprises a receiving unit that receives the request or authentication information from the requestor; a processing unit that performs processing according to the request received by the receiving unit; a job history memory that stores a history of job performed by the processing unit; and a job history display controller that controls a display of a job history list in response to the request from the requestor, wherein the job history display controller restricts a display of a history of job which has been performed in response to a request from other requestor than the first-mentioned requester and belongs to the other requestor.

According to a second aspect of the present invention, the device further comprises a security level setting unit that sets security levels for the display of the job history list, wherein the job history display controller restricts the display of the job history belonging to the other requestor in accordance with to the security levels set by the security level setting unit.

According to a third aspect of the present invention, the security level setting unit holds the security levels so that each of the security levels is associated with a manner of displaying each of items of the job history, and the job history display controller restricts the display of the items of the job history belonging to the other requestor by using the displaying manner associated with the security levels set by the security level setting unit.

According to a fourth aspect of the present invention, the security level setting unit sets a security level for each of items of the job history, and the job history display controller restricts the display of the items of the job history belonging to the other requestor according to the security levels set for the respective items set by the security level setting unit.

According to a fifth aspect of the present invention, the security level setting unit holds the security levels so that each of the security levels for each of the items of the job history is associated with a manner of displaying respective items of the job history, and the job history display controller controls the display of the items of the job history belonging to the other requestor by using the displaying manner associated with the security levels set for each of the items of the job history set by the security level setting unit.

According to a sixth aspect of the present invention, the security level setting unit sets only the security levels that are higher than security levels set under authority of an administrator.

According to a seventh aspect of the present invention, the displaying manner includes non-displaying of contents of the items of the job history, and mask-displaying of the contents of the items of the job history.

According to a eighth aspect of the present invention, a job history display method executed by a device which performs a processing in response to a request from a requester, the method comprises the steps of receiving, by a receiving unit of the device, a request or authentication information from a requestor; performing, by a processing unit of the device, a processing according to the request received by the receiving unit; storing, by a job history memory of the device, a history of the processing performed by the processing unit; and restricting, by a job history display controller, a display of a history of a processing performed in response to a request from other requestor than the first-mentioned requestor and belonging to the other requester when the display of a job history list is controlled in response to the request from the first-mentioned requestor.

According to a ninth aspect of the present invention, the job history display method further comprises the steps of setting, by a security level setting unit, a security level for the display of the job history list, and restricting, by the job history display controller, the display of the job history belonging to the other requestor in accordance with the set security level.

According to a tenth aspect of the present invention, the job history display method further comprises the steps of holding, by the security level setting unit, the security levels so that each of the security levels is associated with a manner of displaying each of the items of the job history; and restricting, by the job history display controller, the display of the items of the job history belonging to the other requestor by using the display methods associated with the set security levels.

According to an eleventh aspect of the present invention, the job history display method further comprises the steps of setting, by the security level setting unit, a security level for each of items of the job history, and restricting, by the job history display controller, the display of the items of the job history belonging to the other requestor in accordance with the security levels set for each of the items.

According to a twelfth aspect of the present invention, the job history display method further comprises the steps of holding, the security level setting unit, the security levels so that each of the security levels of each of the items of the job history is associated with a manner of displaying the items of the job history, and restricting, by the job history display controller, the display of the items of the job history belonging to the other requester by the displaying manner associated with the security levels set for each of the items.

According to a thirteenth aspect of the present invention, the job history display method further comprises the steps of setting only the security levels that are higher than security levels set by the security level setting unit under authority of an administrator.

According to a fourteenth aspect of the present invention, the displaying manner includes non-displaying of contents of the items of the job history, and mask-displaying of the contents of the items of the job history.

It is to be understood that the present invention is not limited to the embodiment as illustrated in the drawings and described in the foregoing, but may be variously embodied within the spirit and scope of the invention. The forgoing description of the embodied within the spirit and scope of the invention. The forgoing description of the embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-273868 filed on Sep. 21, 2005 including specification, claims, drawings and abstract is incorporated herein by reference in its entirety.

What is claimed is:

1. A device for performing a processing in response to a request received from a requestor, comprising:
 a receiving unit that receives the request or authentication information from the requestor;
 a processing unit that performs processing according to the request received by the receiving unit;
 a job history memory that stores a history of job performed by the processing unit;
 a job history display controller that controls a display of a job history list in response to the request from the requestor; and
 a security level setting unit that sets security levels for the display of the job history list,
 wherein the job history display controller restricts a display of a history of job which has been performed in response to a request from other requestor than the first-mentioned requestor and belongs to the other requestor, and
 wherein the job history display controller restricts the display of the job history belonging to the other requestor in accordance with to the security levels set by the security level setting unit.

2. The device according to claim 1, wherein
 the security level setting unit holds the security levels so that each of the security levels is associated with a manner of displaying each of items of the job history, and
 the job history display controller restricts the display of the items of the job history belonging to the other requestor by using the displaying manner associated with the security levels set by the security level setting unit.

3. The device according to claim 1, wherein
the security level setting unit sets a security level for each of items of the job history, and
the job history display controller restricts the display of the items of the job history belonging to the other requestor according to the security levels set for the respective items set by the security level setting unit.

4. The device according to claim 3, wherein
the security level setting unit holds the security levels so that each of the security levels for each of the items of the job history is associated with a manner of displaying respective items of the job history, and
the job history display controller controls the display of the items of the job history belonging to the other requestor by using the displaying manner associated with the security levels set for each of the items of the job history set by the security level setting unit.

5. The device according to claim 2, wherein the security level setting unit sets only the security levels that are higher than security levels set under authority of an administrator.

6. The device according to claim 4, wherein the security level setting unit sets only the security levels that are higher than security levels set under authority of an administrator.

7. The device according to claim 2, wherein the displaying manner includes non-displaying of contents of the items of the job history, and mask-displaying of the contents of the items of the job history.

8. The device according to claim 4, wherein the displaying manner includes non-displaying of contents of the items of the job history, and mask-displaying of the contents of the items of the job history.

9. A job history display method executed by a device which performs a processing in response to a request from a requestor, the method comprising:
receiving, by a receiving unit of the device, a request or authentication information from a requestor;
performing, by a processing unit of the device, a processing according to the request received by the receiving unit;
storing, by a job history memory of the device, a history of the processing performed by the processing unit;
restricting, by a job history display controller, a display of a history of a processing performed in response to a request from other requestor than the first-mentioned requestor and belonging to the other requestor when the display of a job history list is controlled in response to the request from the first-mentioned requestor;
setting, by a security level setting unit, a security level for the display of the job history list; and
restricting, by the job history display controller, the display of the job history belonging to the other requestor in accordance with the set security level.

10. The job history display method according to claim 9, further comprising:
holding, by the security level setting unit, the security levels so that each of the security levels is associated with a manner of displaying each of the items of the job history; and
restricting, by the job history display controller, the display of the items of the job history belonging to the other requestor by using the display methods associated with the set security levels.

11. The job history display method according to claim 9, further comprising:
setting, by the security level setting unit, a security level for each of items of the job history, and
restricting, by the job history display controller, the display of the items of the job history belonging to the other requestor in accordance with the security levels set for each of the items.

12. The job history display method according to claim 11, further comprising:
holding, the security level setting unit, the security levels so that each of the security levels of each of the items of the job history is associated with a manner of displaying the items of the job history, and
restricting, by the job history display controller, the display of the items of the job history belonging to the other requestor by the displaying manner associated with the security levels set for each of the items.

13. The job history display method according to claim 10, further comprising:
setting only the security levels that are higher than security levels set by the security level setting unit under authority of an administrator.

14. The job history display method according to claim 12, further comprising:
setting only the security levels that are higher than security levels set by the security level setting unit under authority of an administrator.

15. The job history display method according to claim 10, wherein the displaying manner includes non-displaying of contents of the items of the job history, and mask-displaying of the contents of the items of the job history.

16. The job history display method according to claim 12, wherein the displaying manner includes non-displaying of contents of the items of the job history, and mask-displaying of the contents of the items of the job history.

* * * * *